United States Patent
Hirano et al.

(10) Patent No.: US 7,600,842 B2
(45) Date of Patent: Oct. 13, 2009

(54) IMAGE REPRODUCING AND FORMING APPARATUS, PRINTER DRIVER AND DATA PROCESSING APPARATUS

(75) Inventors: Masanori Hirano, Kanagawa (JP); Yoshihisa Ohta, Tokyo (JP); Takashi Kimura, Kanagawa (JP); Masakazu Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 418 days.

(21) Appl. No.: 10/565,136

(22) PCT Filed: Jul. 30, 2004

(86) PCT No.: PCT/JP2004/011382

§ 371 (c)(1),
(2), (4) Date: Jan. 18, 2006

(87) PCT Pub. No.: WO2005/011983

PCT Pub. Date: Feb. 10, 2005

(65) Prior Publication Data

US 2006/0181562 A1 Aug. 17, 2006

(30) Foreign Application Priority Data

Aug. 5, 2003 (JP) .............................. 2003-286372
Dec. 15, 2003 (JP) .............................. 2003-417159

(51) Int. Cl.
 *B41J 2/205* (2006.01)
(52) U.S. Cl. .......................................... 347/15; 347/43
(58) Field of Classification Search .................... 347/15, 347/40–43
See application file for complete search history.

(56) References Cited

U.S. PATENT DOCUMENTS

| 5,742,301 | A | 4/1998 | Ikeda |
| 6,254,217 | B1 * | 7/2001 | Askeland et al. .............. 347/43 |
| 6,669,319 | B2 * | 12/2003 | Shimizu ...................... 347/15 |

FOREIGN PATENT DOCUMENTS

| EP | 1072421 A2 | 1/2001 |
| JP | 61-290060 | 12/1986 |
| JP | 62-184855 | 8/1987 |
| JP | 2-167755 | 6/1990 |
| JP | 3-45349 | 2/1991 |

(Continued)

OTHER PUBLICATIONS

Dec. 20, 2007 European Search Report in connection with corresponding European patent application No. 04 74 8275.

(Continued)

*Primary Examiner*—Thinh H Nguyen
(74) *Attorney, Agent, or Firm*—Cooper & Dunham, LLP

(57) ABSTRACT

An image reproducing and forming apparatus comprises a recording head (14) configured to eject liquid droplets of at least one color and capable of bidirectional recording, and a controller (100) configured to control the amount of liquid adhering to a recording paper (3) so as to reduce color difference occurring in the bidirectional recording. The controller includes a gamma correction unit (133) configured to selectively perform a controlled gamma correction using a controlled gamma value adjusted so as to reduce the color difference or an ordinary gamma correction using an ordinary gamma value.

16 Claims, 26 Drawing Sheets

FOREIGN PATENT DOCUMENTS

| | | |
|---|---|---|
| JP | 4-197638 | 7/1992 |
| JP | 6-8474 | 1/1994 |
| JP | 6-30301 | 2/1994 |
| JP | 6-198915 | 7/1994 |
| JP | 7-29423 | 4/1995 |
| JP | 7-314734 | 12/1995 |
| JP | 9-123431 | 5/1997 |
| JP | 11-207999 | 8/1999 |
| JP | 11-320926 | 11/1999 |
| JP | 2000-190473 | 7/2000 |
| JP | 2001-71479 | 3/2001 |
| JP | 2001-235945 | 8/2001 |
| JP | 2001-270139 | 10/2001 |
| JP | 2001-305873 | 11/2001 |
| JP | 2002-46310 | 2/2002 |
| JP | 2003-118096 | 4/2003 |

OTHER PUBLICATIONS

Dec. 7, 2007 Chinese official action (with English translation) in connection with corresponding Chinese patent application No. 2004800275259.

Apr. 1, 2008 Japanese official action in connection with corresponding Japanese patent Application No. 2006-280808.

* cited by examiner

HEAD DRIVING DIRECTION
(FAST SCAN DIRECTION)

PAPER FEED DIRECTION
(SLOW SCAN DIRECTION)

FIG.3
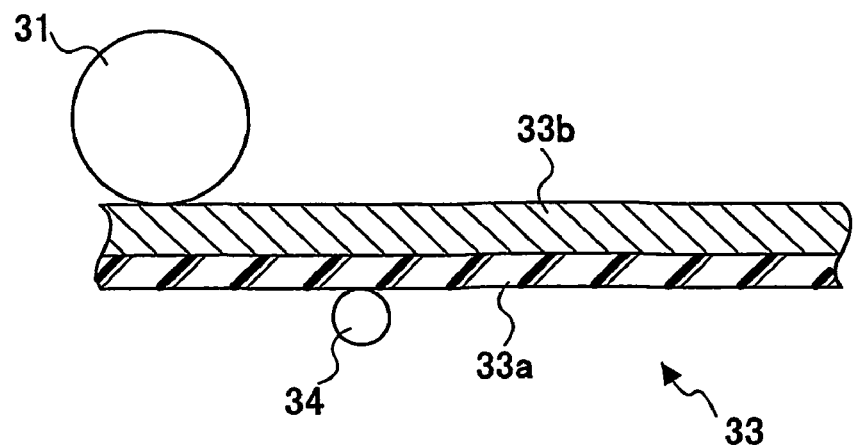
FIG.4A
DIRECTION OF
INK EJECTION ↓
FIG.4B
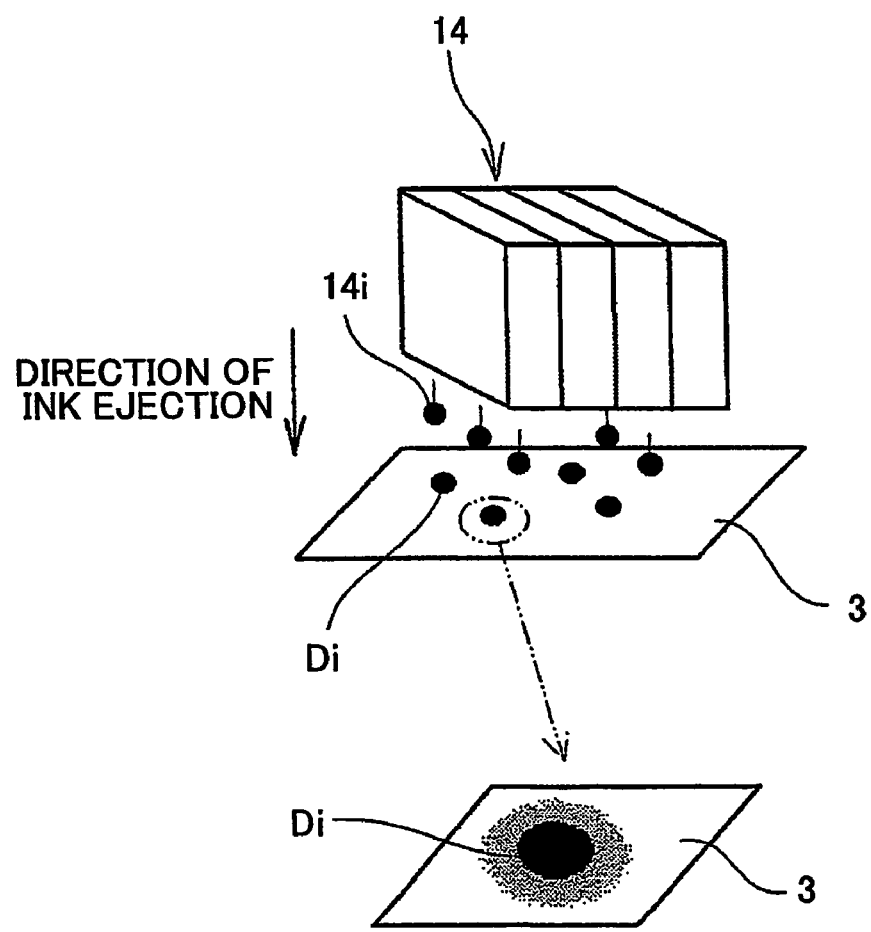

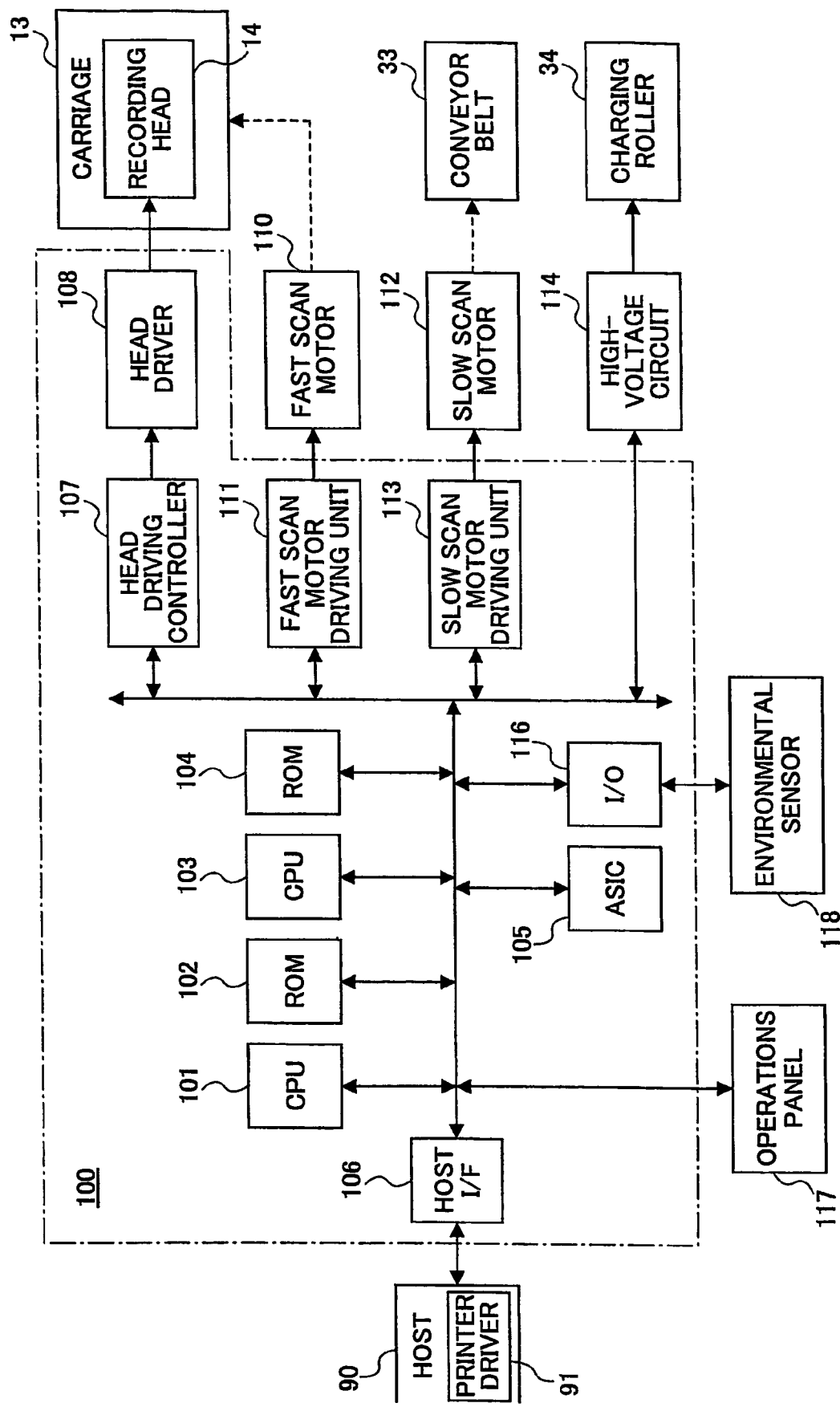

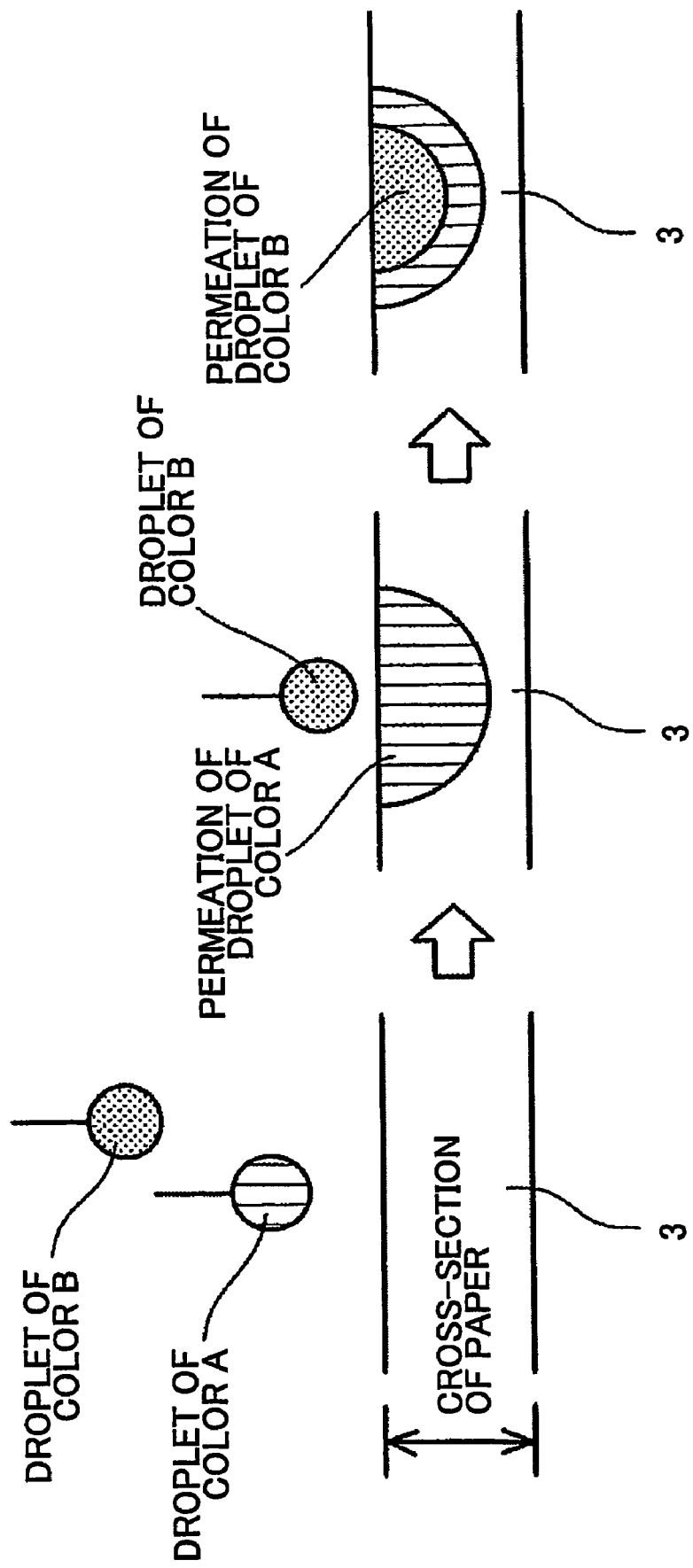

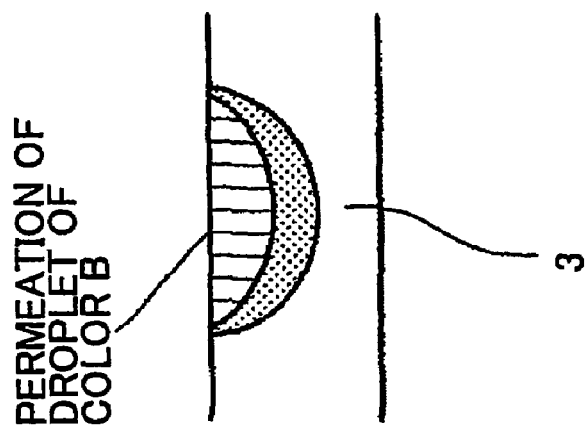
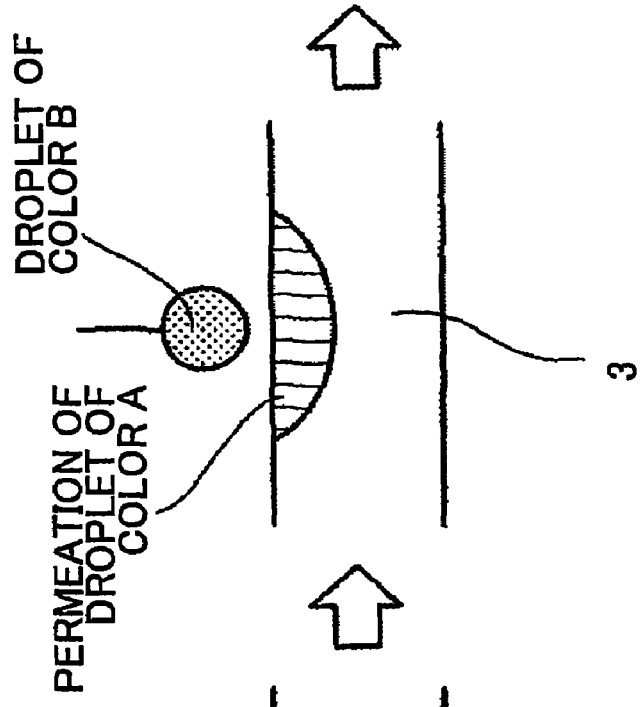
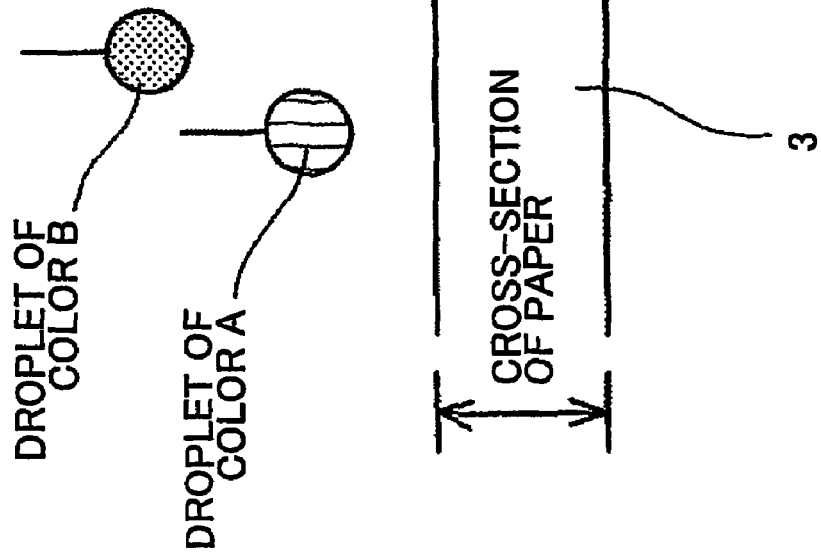

100%

HALFTONING PROCESS →

20%

HALFTONING PROCESS →

60%

HALFTONING PROCESS →

FIG.21
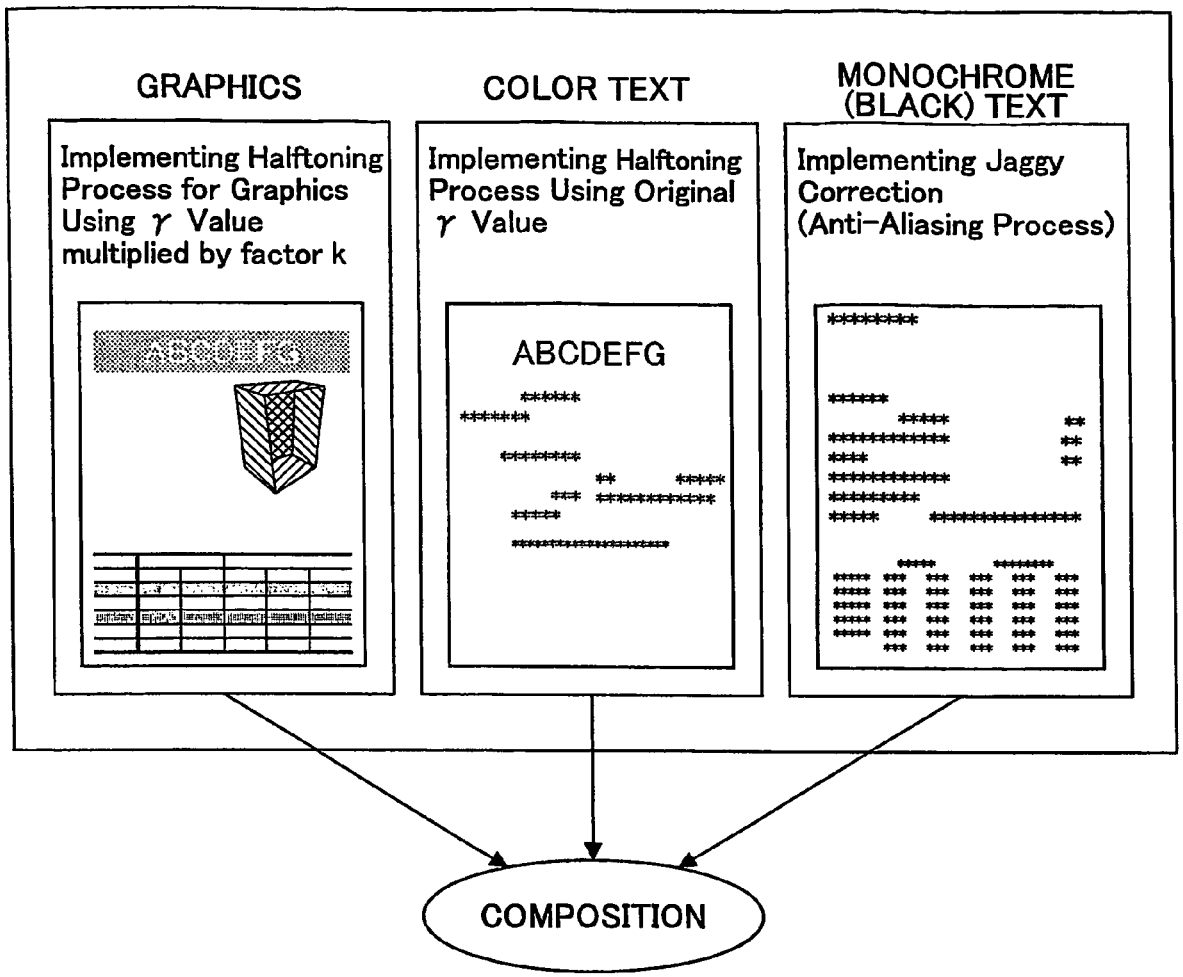
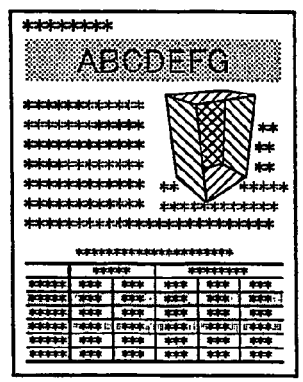

IMAGE REPRODUCING AND FORMING APPARATUS, PRINTER DRIVER AND DATA PROCESSING APPARATUS

BACKGROUND OF THE INVENTION

The present invention generally relates to an image reproducing and forming apparatus, a printer driver, and a data processing apparatus, and more particularly, to an image reproducing and forming apparatus capable of bidirectional printing, while preventing occurrence of color difference. The present invention also relates to an inkjet-type image reproducing and forming apparatus that can prevent leakage of electric charge in an electrostatic attraction paper transport mechanism. The present invention also relates to a printer driver that processes image data so as to prevent color difference in bidirectional recording and/or leakage of electric charge, and to a data processing apparatus loading the printer driver.

"Inkjet recording apparatus" is a type of image reproducing and forming apparatus. Examples of inkjet recording apparatuses include inkjet printers and facsimile machines or copy machines using an inkjet mechanism. An inkjet recording apparatus reproduces an image by ejecting ink droplets or other liquid droplets onto a recording medium (such as paper, an OHP sheet, or any other media to which the droplets can adhere). The inkjet recording apparatus has an advantage in that it is capable of high-speed and high-resolution recording operations. Other advantages of the inkjet recording apparatus are relatively low running cost, less noise, and easiness of color printing using multiple colors of ink.

At the beginning, inkjet recording apparatuses spread rapidly for personal use because of inexpensive pricing and high image quality achieved when using special purpose paper. In recent years and continuing, they have been also used as color recording apparatuses in offices, taking over from mainstream electrophotographic laser printers.

To allow inkjet recording apparatuses to spread for office use, two issues have to be solved. The first issue is applicability to plain paper, which is a cost-relatied problem. When using special purpose paper, inkjet recording apparatuses can reproduce a high-quality printed image as beautiful as photographs.

Special purpose paper is generally expensive, and this makes it difficult for offices and companies to introduce inkjet recording apparatuses under the situation where strict cost management is required. In general, printed materials for office use do not require as high image quality as photographs or pictures. However, it is still disadvantageous for inkjet recoding apparatuses that a high-image quality cannot be achieved unless using special purpose paper.

Meanwhile, ink composition has been improved so as to be suitable and applicable to printing on plain paper. In fact, many attempts have been made, including development of low-permeability dye inks, use of ink-fixing auxiliary agents, and development of pigment inks. Owing to these efforts, recent inkjet machines can reproduce images with the same high quality as achieved by laser printers on plain paper or copy paper typically used in offices.

The second issue is the recording speed. A typical inkjet recording apparatus performs recording operations by ejecting ink droplets onto paper, while repeatedly driving a recording head to and fro many times. This is a so-called "line by line" basis recording technique. Since the recording head is much smaller than the paper size, line-by-line basis printing is disadvantageous from the viewpoint of recording rate, as compared with electrophotography that performs a printing operation on the "surface by surface" or "page by page" basis.

To overcome the disadvantage of the recording rate, attempts have been made to improve the efficiency of the scanning sequence; for example, increasing the ink ejecting cycle so as to shorten the printing time, increasing the size of the recording head, employing a bidirectional printing technique to reduce the number of scans, and scanning only those areas in which image data are actually printedscanned (minimum path control). Some machines have realized a printing speed faster than electrophotographic printing for small or medium volume printing tasks.

Along with the above-described efforts to improve the image quality and the recording speed, inkjet recording apparatuses have become attractive office products. Especially, inkjet recording apparatuses are advantageous in cost, as compared with laser printers, and application to desktop printers is being realized because they can be made compact.

However, unlike laser printers or offset printers with a mechanism of fixing coloring agent onto the surface of paper, inkjet recording apparatuses make use of penetration or permeation of liquid coloring agent into paper when fixing the ink. Accordingly, issues and constraints associated with the permeation process always accompany the inkjet recording apparatuses.

Examples of such issues and constraints include swelling of paper under the influence of water contained in ink. When the swollen or undulated paper comes into contact with the print head, defective images may be formed on the paper due to secondary ink transfer. From the viewpoint of improving the accuracy of ink droplet ejecting position, it is desirable to set the gap between the head and the paper as small as possible. However, unlike inkjet dedicated paper, plain paper for office use is not subjected to anti-swelling treatment. Accordingly, if the gap setting scheme is too strict, smooth recording operations may be prevented due to paper swelling.

There is a time lag between the landing of ink droplet and the start of swelling, which corresponds to time required for the ink to penetrate into the paper. Accordingly, the problem of secondary ink transfer can be avoided by increasing the recording speed, trading off slight image degradation, because priority is given to the recording speed rather to the image quality, in image output for office use.

Another problem is that the ink adhering to the paper earlier colors more brightly than the ink landing on the same spot later. This problem is associated with the ink fixing process. In the bidirectional printing mode that allows the print head to perform printing operations both when moving left to right and when moving right to left, the order of ink adhesion to paper changes between the outward stroke (left to right) and the back stroke (right to left). For this reason, color difference may occur between the outward stroke scanning band and the back stroke scanning band. This phenomenon is observed as stripes overlapping the images to be actually printed. (It should be noted that, in this context, the terms of printing, imaging, image reproducing, and recording are synonymous.)

So far, positive actions have not been taken for solving the problem of color difference because the degradation of image quality due to color difference is not so serious as the secondary ink transfer spoiling the printed matter, and because such stripes occur mainly in the high-speed recording mode that gives priority to the recording speeds, wherein a certain degree of degradation of the image quality is acceptable.

JP 11-320926A discloses a technique for solving the color difference caused in bidirectional recording operations (which is referred to as "color difference in bidirectional recording"). In this publication, the recording head comprises two units whose color arrangements are opposite to each other. These two units are arranged offset from each other by a pitch of the resolution to form an image every other dot line, while superposing color inks, both in the outward stroke and the back stroke. Accordingly, color difference does not occur regardless of performing the one-way recording operation or the bidirectional recording operation.

JP 07-29423B discloses another method for correcting color difference. With this method, the recording operation is carried out every other dot in the outward stroke, and the skipped dots are compensated for by the back stroke.

Since the technique disclosed in JP 11-320926A employs two head unit, the subsystem unit for maintenance and restoration of the head becomes double, which results in undesirable increased cost. Head cleaning time is also doubled, and the probability of inks mixing with each other through the wiping blade for cleaning the nozzle surface increases.

With the technique disclosed in JP 07-29423B, the same line is scanned twice because of the alternate recording (skipping every other dot), and the actual recording time is substantially the same as the one-way recording mode. This means that the high-speed characteristic, which is one of the advantages of bidirectional printing, cannot be achieved.

Returning to the problem of swelling of the wood fiber (or pulp) contained in the paper due to moisture or water components of the ink, the areas on the paper to which the ink droplets adhere become undulated. This phenomenon is called a cockling. Because of the cockling; the paper surface becomes uneven, and the distance between the paper and the nozzle face of the recording head varies depending on the position in the paper. When the cockling is serious, the paper may come into contact with the nozzle face in the worst case, as has been described above. In such a case, both the nozzle face and the paper are stained, and the reproduced image quality is extremely degraded. Furthermore, the ink landing positions vary and are offset from the correct positions due to the cockling effect, and the image cannot be reproduced accurately on the paper.

To overcome this problem, JP 2000-190473A, JP 2001-235945A, and JP 2001-305873A propose to employ an electrically charged belt to hold the paper flat by electrostatic attraction in an inkjet recording apparatus (or electrophotographic apparatus). The electrically charged belt is rotated to convey the paper to the recording position. By holding the paper through electrostatic attraction, the paper can be prevented from floating on the belt, and the paper surface can be maintained flat.

In JP 2000-190473A, the image recording apparatus uses a conveyor belt for transporting paper making use of electrostatic attraction, and voltage application means is brought into contact with the conveyor belt. The conveyor belt is electrically charged by the voltage application means such that a belt-like electric charge distribution pattern is formed on the belt. In JP 2001-235945, electric charges are applied to the paper or the recording medium held on the conveyor belt by charge application means.

However, if an electric charge leaks from the paper for some reason during conveyance of the paper, electrostatic attraction between the paper and the conveyor belt weakens, and the paper transport condition is degraded.

To overcome this, in JP 2000-190473A, displacement means is provided to move at least a portion of the power supply for applying a voltage to an electrostatic generator upward above the paper holding surface of the conveyor belt. This arrangement aims to prevent ink from flowing into the power supply and prevent undesirable short circuits.

Since ink droplets are ejected onto a recording medium (such as paper) in an inkjet type image reproducing and forming apparatus, there are always possibilities of occurrence of electric charge leakage due to the moisture component of the ink absorbed in the paper held on the electrostatic attraction belt. The degree of the electric charge leakage depends on the amount of ink adhering to the paper.

Although the image reproducing/forming apparatus disclosed in JP 2000-190473A is adapted to prevent electric charge leakage from the conveyor belt, it does not address the prevention of leakage of electric charge due to ink itself ejected to and absorbed in the paper.

SUMMARY OF THE INVENTION

In an aspect of this disclosure, there is provided an approach for high-speed, high-quality image reproduction by effectively correcting color difference in bidirectional recording operations, without causing the cost to go up or the speed to go down.

In another aspect of this disclosure, there is provided an approach to prevent leakage of electric charges caused by liquid droplets landing on a recording medium, while maintaining stable paper transport performance and the image quality reproduced on the recording medium high.

In another aspect of this disclosure, the amount of ink adhering to a recording medium is efficiently controlled so as to prevent at least one of color difference in bidirectional recording and leakage of electric charge occurring when using an electrostatic attraction belt.

In another aspect of this disclosure, an image reproducing and forming apparatus comprises a recording head configured to eject liquid droplets of at least one color and capable of bidirectional recording, and a controller configured to control an amount of liquid adhering to a recording paper so as to reduce color difference occurring in the bidirectional recording.

Preferably, the controller has a determination unit that determines whether an object to be output is text. The controller does not perform a process of reducing the color difference when the object to be output is text. Alternatively, the determination unit determines an object to be output and the number of colors used in the bidirectional recording. In this case, the controller does not perform a process of reducing the color difference when the object to be output is not text and when the number of colors is one.

In a preferred example, the controller selectively performs either a controlled gamma correction for controlling the amount of liquid adhesion so as to reduce the color difference or an ordinary gamma correction not addressed to reduction of the color difference, based on the determination result of the determination unit.

In a preferred example, the controller uses a controlled gamma value to perform the controlled gamma correction, and uses an ordinary gamma value to perform the ordinary gamma correction.

The controlled gamma value is a product of the ordinary gamma value and a factor K, wherein K is set in the range from 0.35 to 0.65. More preferably, the factor K ranges from 0.5 to 0.6.

When duplexing is performed in the bidirectional recording, the controlled gamma value is obtained by multiplying the product by a factor M, wherein M is less than 1.0.

In another aspect of this disclosure, a printer driver installed in a computer and configured to process image data to be supplied to an image reproducing and forming apparatus capable of bidirectional recording using a recording head for ejecting liquid droplets of at least one color onto a recording medium, is provided. The printer driver comprises a control unit configured to control the amount of liquid adhering to the recording medium so as to reduce color difference occurring in the bidirectional recording.

In a preferred example, the printer driver determines whether an object to be output is text, wherein the control unit does not perform a process of reducing the color difference when the object to be output is text. Alternatively, the printer driver determines an object type and the number of colors used in image data, and wherein the control unit does not perform a process of reducing the color difference when the object type is not text and when the number of colors is one.

Preferably, the printer driver includes a gamma correction unit configured to selectively perform either a controlled gamma correction for controlling the amount of liquid adhesion or an ordinary gamma correction not for controlling the amount of liquid adhesion, based on the determination result of the determination unit.

In still another aspect of this disclosure, a data processing apparatus for processing image data to be supplied to an image reproducing and forming apparatus capable or bidirectional recording using a recording head for ejecting liquid droplets of at least of one color onto a recording medium, is provided. In the data processing apparatus, the above-described printer driver is installed.

In yet another aspect of this disclosure, an image reproducing and forming apparatus capable of preventing leakage of electric charge is provided. The image reproducing and forming apparatus comprises a transport mechanism configured to convey a recording medium by electrostatic attraction, an image recording unit configured to form an image on the recording medium by ejecting liquid droplets onto the recording medium, and a control unit configured to control the amount of liquid adhering to the recording medium so as to prevent leakage of electric charge from the recording medium.

In a preferred example, the control unit includes a gamma correction processing unit that controls the amount of liquid adhesion to the recording medium through gamma correction.

For example, the gamma correction processing unit selectively performs first gamma correction for preventing leakage of electric charges and second gamma correction not addressed to prevention of leakage of electric charges.

When controlling the amount of liquid adhesion, or when performing the first gamma correction, a controlled gamma value obtained by multiplying an ordinary gamma value by factor K (K<1.0) is used.

The factor K may be selected according to an object type of image data to be recorded. Alternatively, the value of the factor K may be varied depending on an environmental condition, or depending on the amount of data to be output in a page.

When conducting duplex printing, a second controlled gamma value obtained by multiplying the controlled gamma value by factor M (M<1.0) is used.

BRIEF DESCRIPTION OF THE DRAWINGS

Other aspects, features, and advantages will become more apparent from the following detailed description when read in conjunction with the accompanying drawings, in which:

FIG. 3 illustrates a conveyor belt for transporting a recording medium and a charging roller pressed against the conveyer belt used in the inkjet recording apparatus shown in FIG. 1;

FIG. 4A and FIG. 4B are schematic diagrams used to explain the recording operation of the inkjet recording apparatus shown in FIG. 1;

FIG. 5 is a block diagram illustrating the control unit of the inkjet recording apparatus shown in FIG. 1 and a printer driver connected to the apparatus according to the first embodiment of the invention;

FIG. 9A through FIG. 9C are schematic diagram illustrating permeation of dye ink droplets into the paper;

FIG. 10A through FIG. 10C are schematic diagrams illustrating permeation of pigment ink droplets into the paper.

FIG. 21 is a diagram showing different types of data processing implemented for different types of data objects, and image synthesis of these data objects;

PREFERRED EMBODIMENTS OF THE INVENTION

Figure 1:
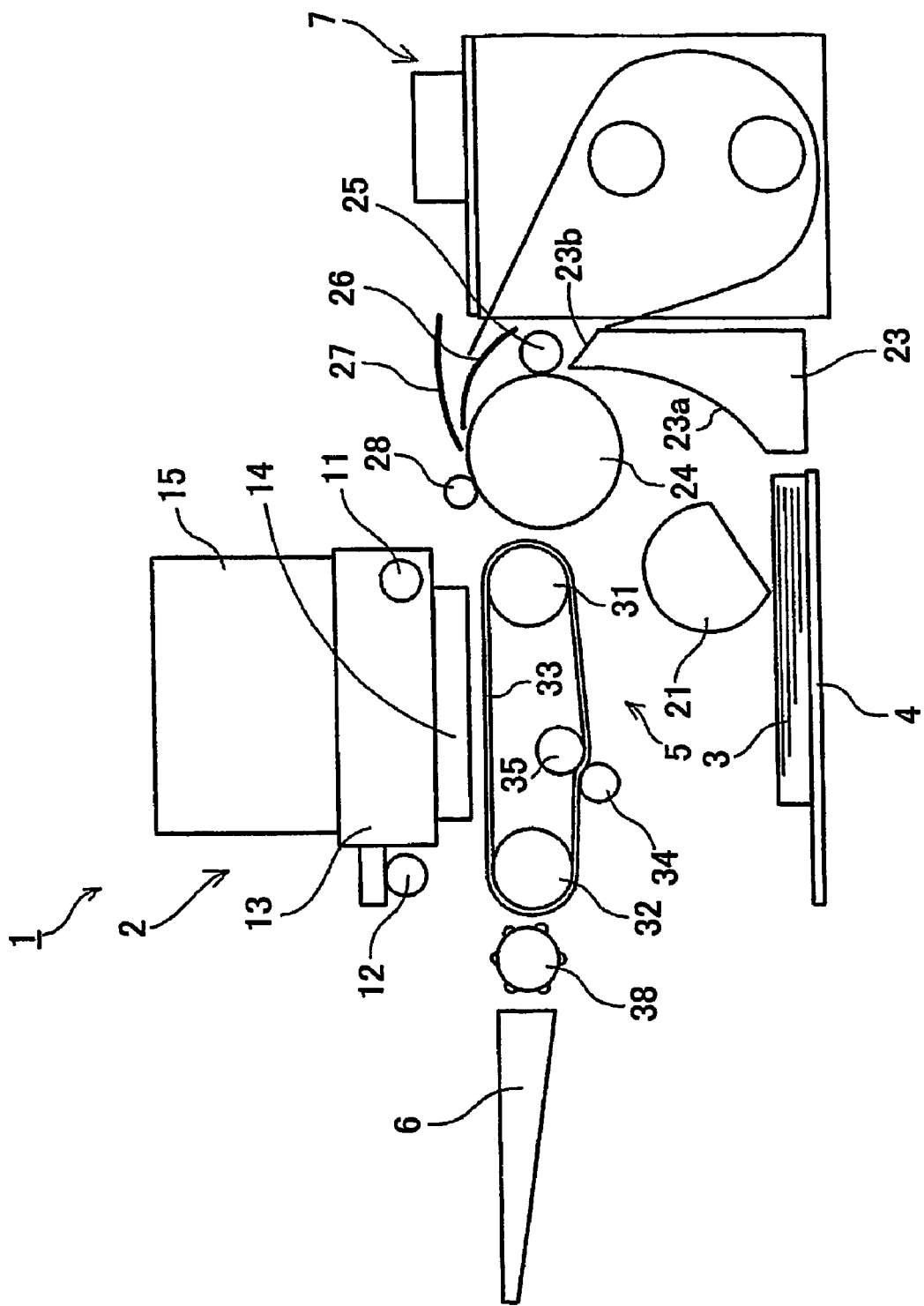
FIG. 1 is a schematic diagram illustrating the printing mechanism of an inkjet recording apparatus according to an embodiment of the invention.
Figure 2A:
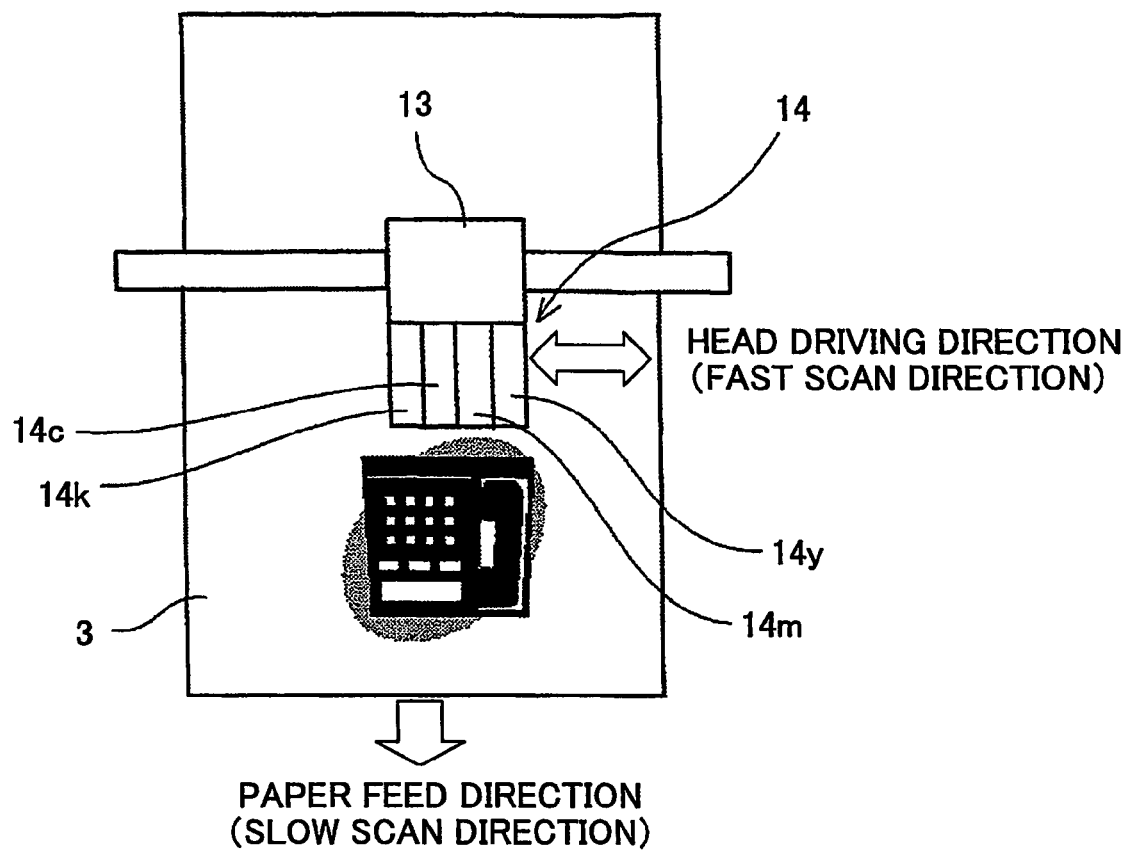
FIG. 2A is a plan view of the major part of the inkjet printing mechanism shown in FIG. 1.
Figure 2B:
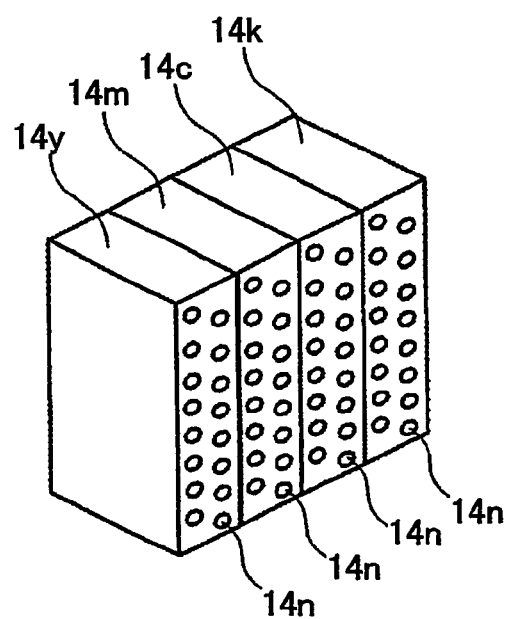
FIG. 2B is a perspective view of the recording head unit used in the inkjet recording apparatus shown in FIG. 1.

The preferred embodiments of the present invention are described below with reference to the attached drawings. FIG. 1 is a schematic diagram illustrating the overall structure, including the printing mechanism, of an inkjet recording apparatus, which is an example of the image reproducing and forming apparatus according to an embodiment of the invention. FIG. 2A is a plan view of the major part of the printing mechanism, and FIG. 2B is a perspective view illustrating the head structure of the inkjet recording apparatus. FIG. 3 is a schematic diagram illustrating the conveyor belt for transporting a recording medium making use of electrostatic attraction according to an embodiment of the invention.

The inkjet recording apparatus 1 includes an image recording unit 2, a paper feed tray 4 positioned on the bottom of the inkjet recording apparatus and accommodating paper 3 (as the recording medium), and a transport mechanism 5 for transporting the paper 3 supplied from the paper feed tray 4 to the image recording unit 2. When an image is recorded on the paper, the paper is output to the output tray 6 attached to the side panel of the main body of the inkjet recording apparatus 1.

The inkjet recording apparatus 1 also includes a duplexing unit 7, which is attachable to and detachable from the main body of the inkjet apparatus 1. In performing duplex printing, an image is printed on the first face (top face) of paper 3, and then, the paper 3 is fed in the backward direction by the transport mechanism 5 toward the duplxeing unit 7 where the paper 3 is reversed to make the back face up. The reversed paper 3 is again supplied to the image recording unit 2 to print another image on the back face. The duplexed paper 3 is output onto the output tray 6.

The image recording unit 2 includes a carriage 13 held by guide shafts 11 and 12 so as to slide along the guide shafts 11 and 12. The carriage 13 is moved in the fast scan direction perpendicular to the paper feed direction by a fast scan motor (not shown). A recording head 14 is mounted in the carriage 13. The recording head 14 has a plurality of nozzle orifices 14n for ejecting liquid droplets, as illustrated in FIG. 2B. An ink cartridge 15 is also mounted on the carriage 13 in a detachable manner in order to supply liquid ink to the recording head 14. The ink cartridge 15 may be replaced by a sub-tank so as to supply ink from the main tank (not shown) to the recording head 14.

The recording head 14 has, for example, four independent inkjet heads 14y, 14m, 14c, and 14k for ejecting ink droplets of yellow (Y), cyan (c), magenta (M), and black (B), respectively, as illustrated in FIG. 2A and FIG. 2B. Alternatively, the recording head 14 may have a single inkjet head having multiple nozzle arrays for ejecting the respective colors of ink droplets. It should be noted that the structure of the recording head 14, the ink colors, and the number of colors are not limited to these examples.

The inkjet head that structures the recording head 14 has an energy generator for generating energy for ejecting ink droplets. Examples of such an energy generator include a piezoelectric actuator using piezoelectric elements, a thermal actuator using electric-to-heat converting elements (such as heating resistors) making use of phase change due to film boiling of a liquid, a shape memory alloy actuator making use of metal phase change due to temperature change, and an electrostatic actuator using electrostatic force.

A sheet of paper 3 is extracted from a stack of paper placed in the paper feed tray 4 by a pickup roller (meniscus roller) 21 and a separating pad (not shown), and supplied to the transport mechanism 5 in the main body of the inkjet recording apparatus 1.

The transport mechanism 5 includes a transport guide 23 having a guide surface 23a for guiding the paper 3 supplied from the paper feed tray 4 upward and a guide surface 23b for guiding the paper 3 from the duplexing unit 7. The transport mechanism 5 also includes a feed roller 24 for feeding the paper 3, a pressure roller 25 for pressing the paper 3 against the feed roller 24, a guide 26 for guiding the paper 3 toward the feed roller 24, a guide 27 for guiding the paper 3 backward to the duplexing unit 7, and a holding roller 28 for holding down the paper 3 fed from the feed roller 24.

The transport mechanism 5 also includes a conveyor belt 33, which is wound around the driving roller 31 and the tension roller 32 to transport the paper 3, while maintaining the flatness of the paper 3 below the recording head 14. A charging roller 34 for electrically charging the conveyor belt 33 and a guide roller 35 are arranged on either side of the conveyor belt 33, such that the conveyor belt 33 is held between the charging roller 34 and the guide roller 35. Although not shown in FIG. 1, a platen plate for holding the conveyor belt 33 so as to face the image recording unit 2 and a cleaning roller made of a porous material for removing ink adhering on the conveyor belt 33 are also provided.

The conveyor belt 33 is a looped belt, and rotates in the paper feed direction around the driving roller 31 and the tension roller 32.

FIG. 3 illustrates a structural example of the conveyor belt 33. In this example, the conveyor belt 33 has a first layer (top layer) 33a and a second layer (back layer) 33b. The first layer (top layer) 33a is made of, for example, a pure resin film, such as an ETFE pure material, with a thickness of about 40 μm, which has not been subjected to resistance control. The second layer (back layer) 33b is made of the same material as the first layer, and is subjected to resistance control using carbon. The first layer (top layer) 33a functions as the paper attraction face, and the second layer (back layer) 33b functions as a grounding layer or an intermediate resisting layer.

The charging roller 34 is in contact with the top layer 33a of the conveyor belt 33, and rotates following the rotation of the conveyor belt 33. A high voltage is applied to the charging roller 34 from a high-voltage power supply (not shown) at a predetermined voltage application pattern.

Returning to FIG. 1, an output roller 38 is arranged downstream of the transport mechanism 5 to eject the paper 3 on which an image is formed onto the output tray 6.

In the image reproducing and forming apparatus illustrated in FIG. 1, the rotating conveyor belt 33 rotates in a prescribed direction, and is electrically positively charged by the charging roller 34 pressed against the conveyor belt 33 under application of a high voltage. By switching (or reversing) the polarity at a prescribed time interval, the pitch of electrically charging the conveyor belt 33 using the charging roller 34 can be controlled to a desired pitch.

When the paper 3 is supplied onto the conveyor belt 33 electrically charged at a high voltage, the inside of the paper 3 is polarized, and electric charges having opposite polarity are induced in the interface between the conveyor belt 33 and the paper 3. The electric charges on the conveyor belt 33 and the opposite charges induced on the paper 3 attract each other, and consequently, the paper 3 is electrostatically adhered to the conveyor belt 33. Since the paper 3 is strongly adhered to the conveyor belt 33, the bending or undulating surface of the paper 3 is corrected to a highly flat surface.

The recording head 14 is driven in response to pixel signals by moving the carriage 13 for one-way or bidirectional scanning, while the paper 3 on the rotating conveyor belt 33 is transported. Ink droplets 14i are ejected from the recording head 14 toward the stationary paper 3, as illustrated in FIG. 4A to form a line of dots Di of the image on the paper 3. Then, the paper 3 is fed by a prescribed distance to carry out the recording operation for the next line of the image. The recording operation for this page is finished when the recording head 14 receives a job termination signal or when the trailing edge of the paper 3 is detected in the recording area. The dot Di formed on the paper is illustrated in an enlarged view in FIG. 4B. The paper 3 on which an image has been recorded is output by the output roller 38 onto the output tray 6.

FIG. 5 is a block diagram of the control unit 100 of the inkjet recording apparatus (or the image reproducing/forming apparatus) 1. The control unit 100 includes a CPU 101 for controlling the overall operation of the inkjet recording apparatus 1, a ROM 102 for storing programs executed by the CPU 101 and other fixed data, a RAM 103 for temporarily storing pixel data, a nonvolatile memory (NVRAM) 104 for retaining data during shutdown of the power supply, and an ASIC 105. The ASIC 105 processes input and output signals for implementing image processing, including processing of various types of signals and rearrangement of data, and for controlling the overall operations of the apparatus.

The control unit 100 also includes an interface (I/F) 106 for conducting data transfer to and from a host computer 90, which is, for example, a personal computer that functions as a data processing apparatus according to the invention. The control unit 100 also includes a head driver 108 for driving the recording head 14, and a head driving controller 107 for controlling the head driver 108. The control unit 100 also includes a fast scan motor driving unit 111 for driving a fast scan motor 110, and a slow scan motor driving unit 113 for driving a slow scan motor 112. The control unit 100 has an input/output unit 116 for receiving various detecting signals from the environmental sensor 118 for detecting the environmental temperature or humidity and other sensors (not shown).

An operations panel 117 is connected to the control unit 100. Necessary information is displayed on the operations panel 117, and it allows a user to input information required for the operations of the inkjet recording apparatus 1. A high-voltage circuit (or power supply) 114 for applying a high voltage to the charging roller 34 is also connected to the control unit 100, and the control unit 100 controls the ON/OFF switching and the polarity of the high voltage circuit 114.

The control unit 100 receives print data at the interface 106 from the host apparatus 90 via a cable or a network, and temporarily stores the print data in a buffer (not shown) of the interface 106. The host apparatus 90 includes data processing apparatuses (such as personal computers), image readers (such as image scanners), and image pickup apparatuses (such as digital cameras). The print data supplied to the controller 10 of the inkjet recording apparatus are generated by and output from the printer driver 91 installed in the host apparatus 90.

The CPU 101 reads the print data from the buffer of the interface 106, and analyzes the print data. The ASIC 105 executes necessary image processing operations, such as rearrangement of data, and supplies the processed pixel data to the head driving controller 107. Conversion of the print data into bitmap data used for outputting the image is carried out by the printer driver 91 of the host apparatus 90 by developing image data into bitmap data. Alternatively, the print data may be converted to bitmap data by the controller 100 of the inkjet recording apparatus, using font data stored in the ROM 102.

The head driving controller 107 receives a line of pixel data (dot pattern data) corresponding to a scanning line of the recording head 14, and outputs serial data to the head driver 108 synchronized with a clock signal. The head driving controller 107 also outputs a latch signal to the head driver 108 at prescribed timing.

The head driving controller 107 includes a ROM for storing pattern data for driving pulses, and a driving pulse generating circuit for producing a driving pulse based on the pattern data read from the ROM. The pattern data for driving pulses may be stored in ROM 102. The driving pulse generating circuit includes a digital-to-analog converter for converting the pattern data read from the ROM into an analog format, and an amplifier.

The head driver 108 includes a shift register that receives the clock signal and the serial pixel data from the head driving controller 107, a latch circuit that latches the register value of the shift register at timing of a latch signal supplied from the head driving controller 107, and a level shifter for shifting the level of the output value from the latch circuit. The head driver 108 also includes an analog switch array, the ON/OFF operation of which is controlled by the level shifter. Based on the ON/OFF control of the analog switch array, a desired driving pulse is applied selectively to the actuator of the recording head 14 to drive the head.

Figure 6:
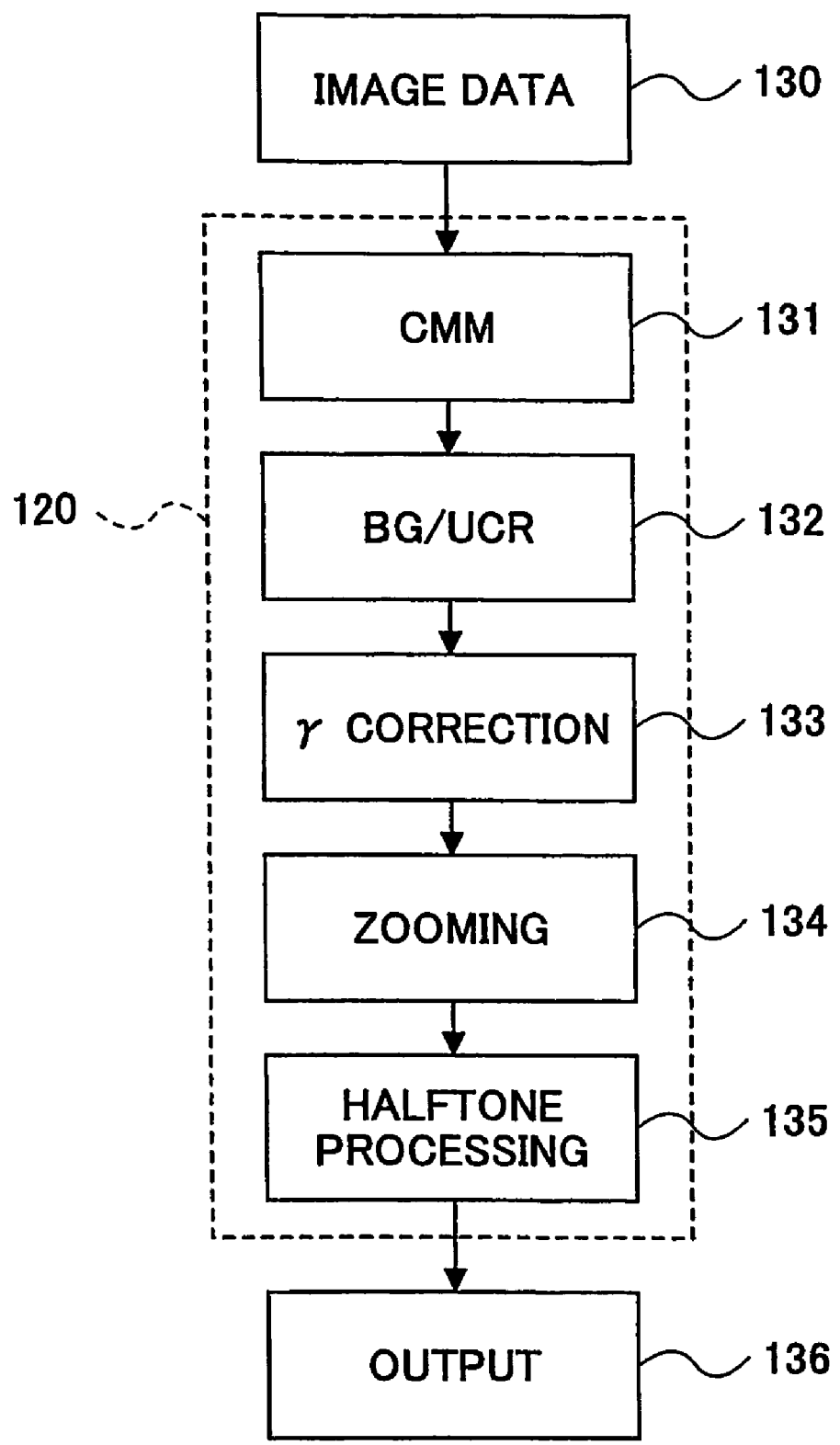
FIG. 6 is a functional block diagram illustrating an example of the printer driver installed in a data processing apparatus to carry out gamma correction.
Figure 7:
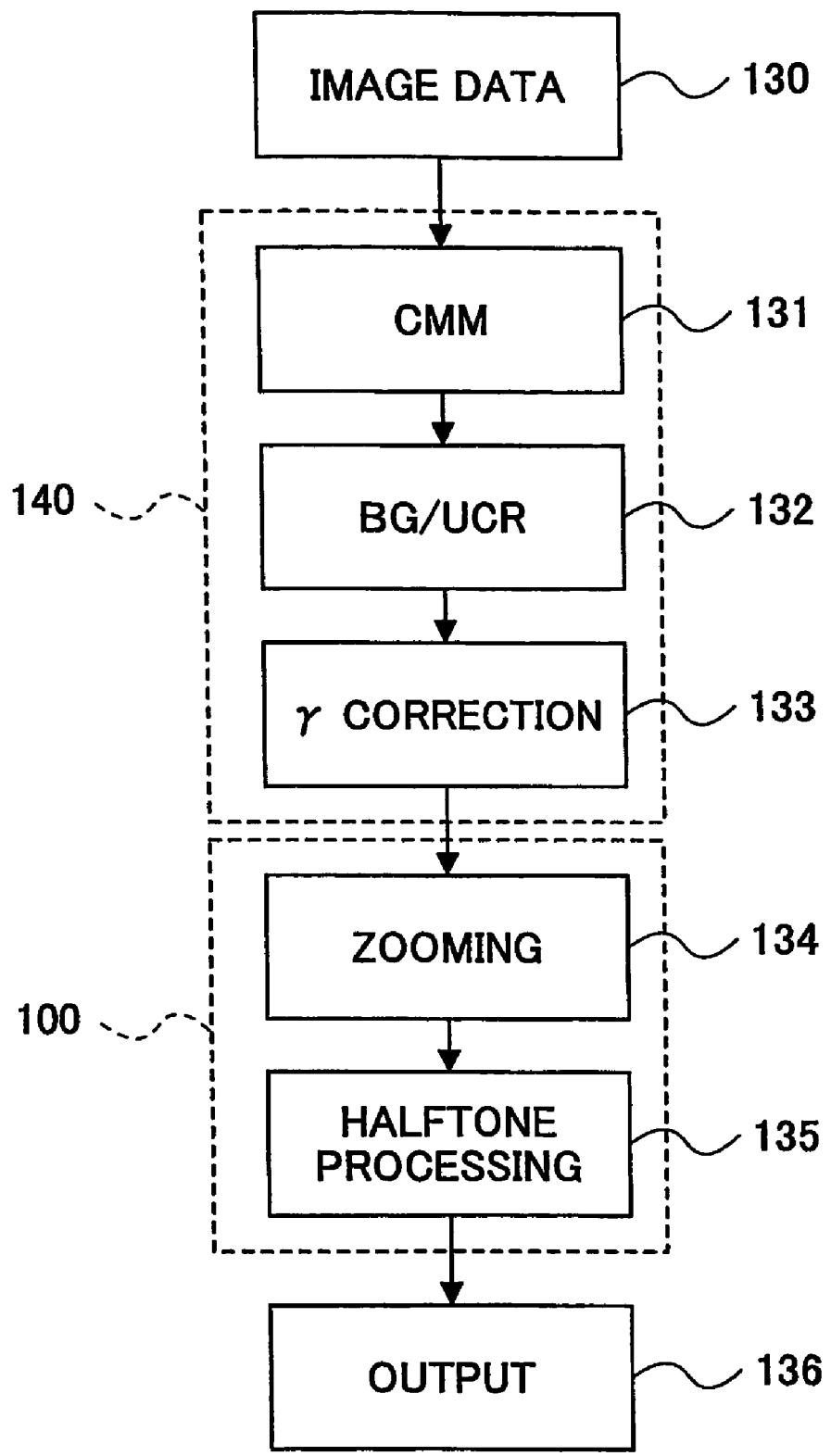
FIG. 7 is a functional block diagram illustrating another example of the printer driver installed in the data processing apparatus to carry out gamma correction, as well as the control unit of the image reproducing and forming apparatus connected to the data processing apparatus.

FIG. 6 and FIG. 7 show examples of how image data are processed. In FIG. 6, most of the data processing is performed in the printer driver 91 of the data processing apparatus (or the host apparatus) 90, while the workload of data processing is shared by the printer driver 91 and the controller 100 of the inkjet recording apparatus in FIG. 7.

In the example shown in FIG. 6, the printer driver 91 has a controller 120, which comprises a color management module (CMM) processing unit 131, a black generation/under color removal (BG/UCR) processing unit 132, a gamma correction unit 133, a zooming unit 134, and a halftone processing unit 135. The CMM processing unit 131 receives image data 130 from application software, and converts the RGB color space for the monitor display to the CMY color space for the inkjet recording apparatus. The BG/UCR processing unit 132 performs black generation and under color removal on the CMY-space image data. The gamma correction unit 133 comprises an ink adhesion control unit for adjusting or reducing the amount of ink adhering to paper, and it makes correction to the input and output signals taking into account the machine characteristics of the inkjet recording apparatus and the user's preference. The zooming unit 134 performs a zooming operation in accordance with the resolution of the inkjet recording apparatus. The halftone processing unit 135 includes a multi-level/binary-level matrix (not shown) for arranging the image data into a dot pattern to be reproduced by ink droplets ejected from the recording head.

In the example shown in FIG. 7, the printer driver 91 has a controller 140, which comprises a color management module (CMM) processing unit 131, a black generation/under color removal (BG/UCR) processing unit 132, and a gamma correction unit 133. As in the structure shown in FIG. 6, the CMM processing unit 131 converts the RGB color space of the image data 130 supplied from the application software to the CMY color space. The BG/UCR processing unit 132 performs black generation and under color removal on the CMY-space image data. The gamma correction unit 133 comprises an ink adhesion control unit and makes correction to the input and output signals taking into account the machine characteristics of the inkjet recording apparatus and the user's preference.

The image data subjected to gamma correction are supplied to the controller 100 of the inkjet recording apparatus, which comprises a zooming unit 134 and a halftone processing unit 135. The image data are subjected to the zooming process at the zooming unit 134, and developed into a dot pattern using a multi-level/binary-level matrix (not shown) provided in the halftone processing unit 135.

Next, explanation is made of color difference in bidirectional recording, which is a problem to be solved by the present invention, with reference to FIG. 8 through FIG. 13.

Figure 8:
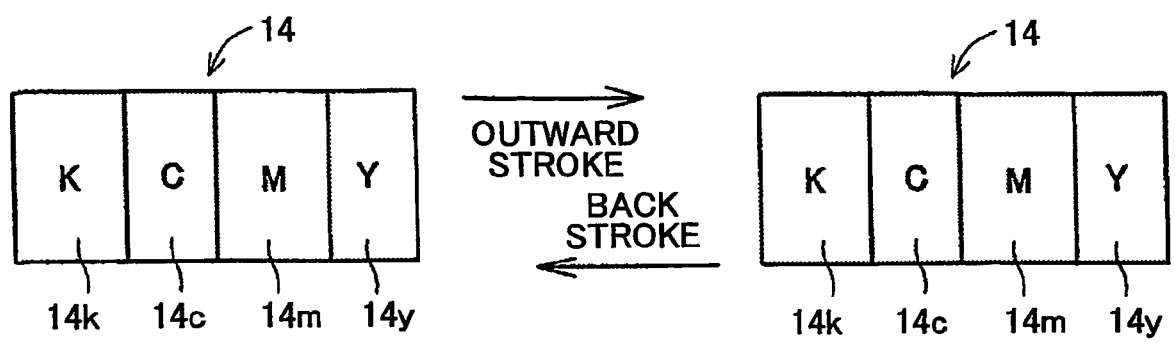
FIG. 8 is a schematic diagram used to explain occurrence of color difference.

In FIG. 8 the recording head 14 comprises head units 14$k$, 14$c$, 14$m$, and 14$y$ corresponding to black (K), cyan (C), magenta (M), and yellow (Y) and arranged in this order in the fast scan direction. Of course, the recording head 14 is not limited to this example, and a different arrangement of head units and more colors may be employed.

In bidirectional printing (or recording), printing operations are performed in both the outward stroke and the back stroke of the carriage, and accordingly, the number of reciprocations of the carriage and recording time required for each paper are greatly reduced. On the other hand, the recording positions in the back stroke are likely to be offset from those in the outward stroke in the reciprocating motion. In addition, undesirable color difference is likely to occur due to the different order of color superposition between the outward stroke and the back stroke, which degrades the quality of the printed image. For this reason, bidirectional printing is employed in a recording mode that gives priority to the recording speed, rather than the image quality.

In the example shown in FIG. 8, ink droplets are ejected in the order of black (K), cyan (C), magenta (M), and yellow (Y) in the outward stroke. In the back stroke, ink droplets are ejected in reverse order, that is, the order of yellow (Y), magenta (M), cyan (C), and black (K). As a coloring agent fixing characteristic, if different colors of ink droplets land on the same spot on the paper, the color of the ink droplet that has landed on the spot first becomes dominant.

FIGS. 9A through 9C are diagrams showing distribution of coloring agents inside paper when different colors of dye ink are ejected onto the same spot on the paper. An ink droplet of color A and an ink droplet of color B are ejected to paper 3 in this order, as illustrated in FIG. 9A. The ink droplet of color A shot first permeates the paper 3, as illustrated in FIG. 9B. In this state, if the next droplet of color B is shot into the same spot, the droplet of color B penetrates only inside the permeated region of the first droplet of color A, as illustrated in FIG. 9C. In other words, the first droplet of color A spreads to a wider area than the second droplet of color B, and there is a difference in fixing areas of coloring agents. When printing with a secondary color produced by combination of, for example, cyan and magenta (C+M) or magenta and yellow (M+Y), the color of the first-shot droplet becomes the dominant color component.

FIG. 10A through FIG. 10C are diagrams showing distribution of coloring agents inside paper when different colors of pigment ink are ejected onto the same spot on the paper. An ink droplet of color A and an ink droplet of color B are ejected to paper 3 in this order, as illustrated in FIG. 10A. The ink droplet of color A first permeates the paper 3, as illustrated in FIG. 10B. Then, if the next droplet of color B is shot into the same spot, the droplet of color B completely penetrates through the permeated region of the first droplet of color A and gets deeper inside the paper 3, as illustrated in FIG. 10C. In this case, the coloring agent of the first droplet A remains in the surface area of paper 3, while the coloring agent of the second droplet B sinks into the paper 3. Consequently, the characteristic of the coloring agent remaining near the surface (first ejected droplet A) becomes stronger and that coloring agent becomes the dominant color component.

Returning to FIG. 8, since the ink droplets are shot in the order of K→C→M→Y in the outward stroke, the degree of dominance in the resultant color tone becomes K>C>M>Y. In reverse, the ink droplets are shot in the order of Y→M→C→K in the back stroke, the degree of dominance in the resultant color tone becomes Y→M→C→K.

Figure 11:
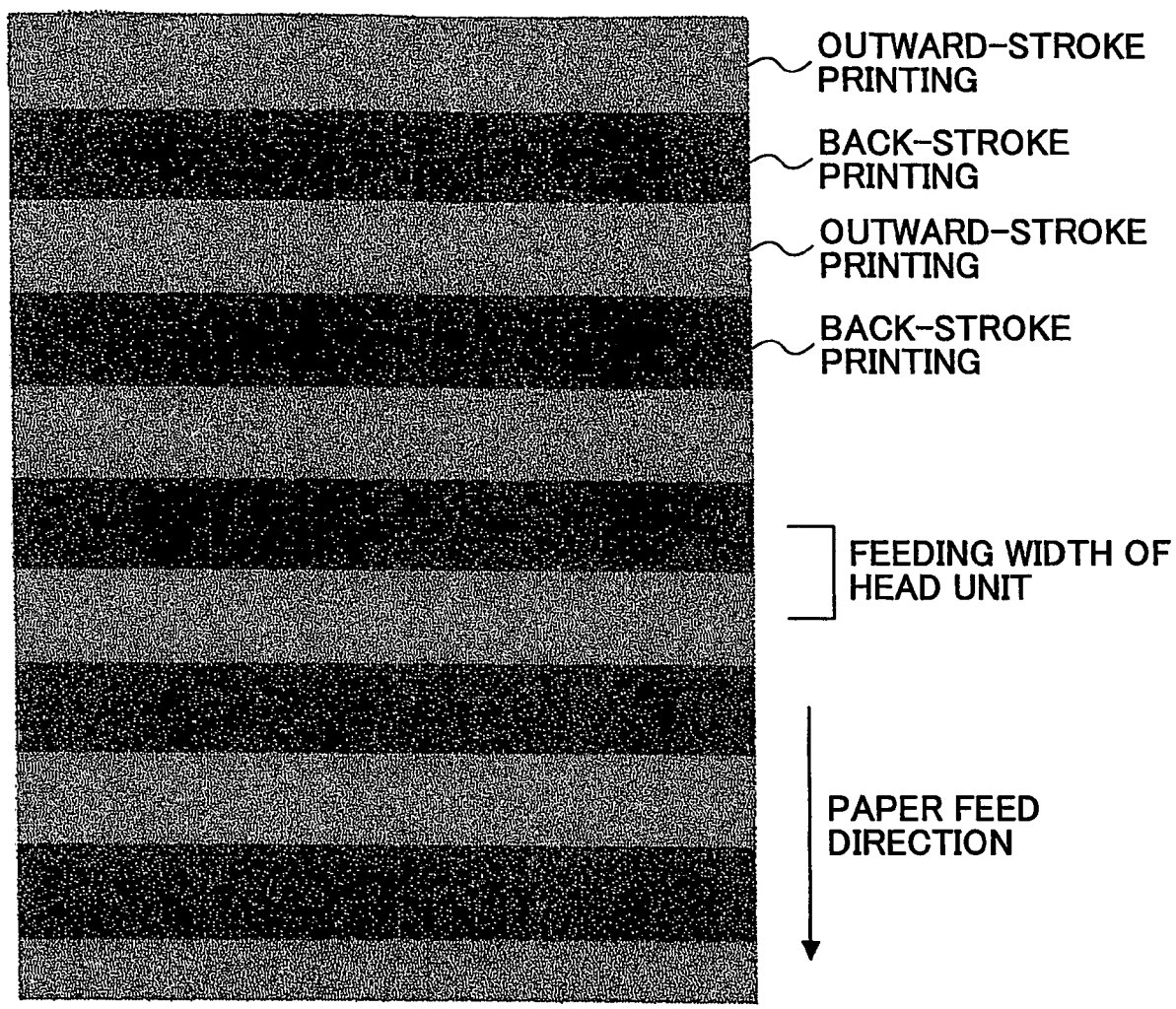
FIG. 11 is an example of stripes formed on the paper due to color difference.

When employing bidirectional recording to increase the recording rate, variation in color tones in secondary colors or tertiary colors (C+M+Y, etc.) due to the ink penetration characteristics has to be taken into account. Especially when the paper is fed by a certain distance at every stroke (each of the outward strokes and the back strokes), change in color tone may result in stripes, as illustrated in FIG. 11.

To reduce the color difference in bidirectional printing, the amount of ink adhering to paper is controlled or reduced in the preferred embodiments of the invention. The amount of ink adhesion is controlled by, for example, gamma correction so as to reduce color difference in bidirectional printing.

Figure 12:
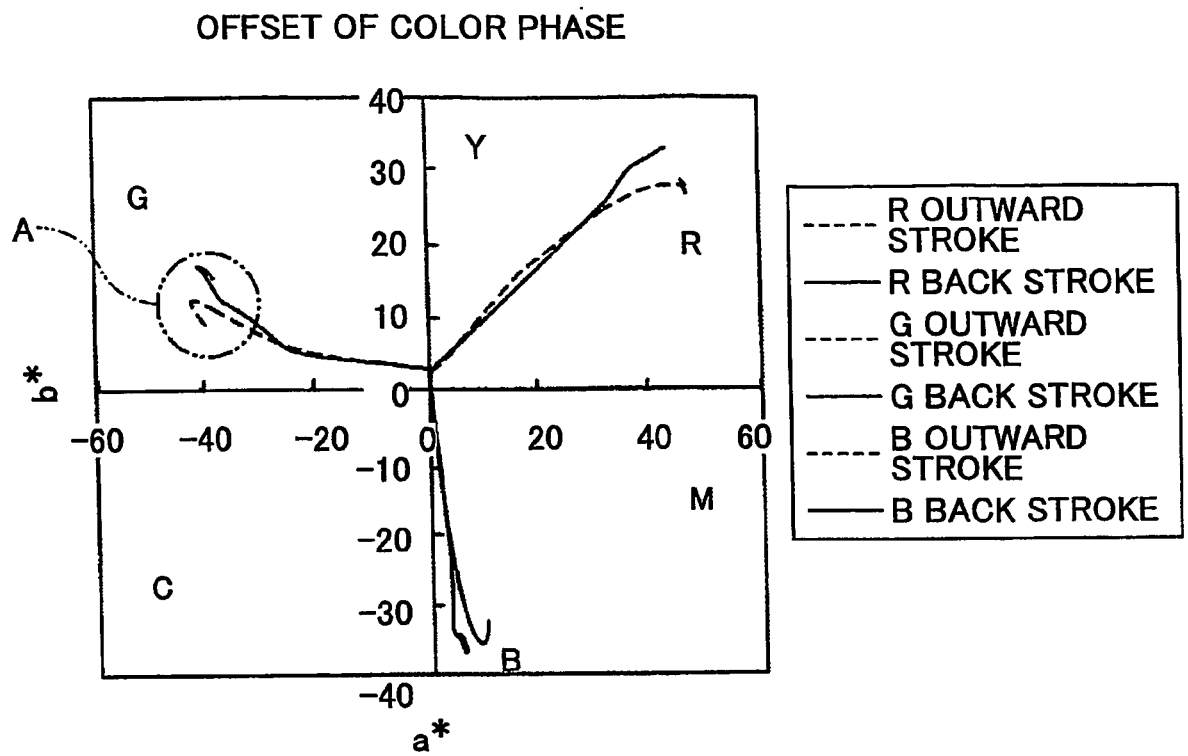
FIG. 12 is a chart showing color offset of secondary colors represented on the L*a*b* chromaticity coordinates.
Figure 13:
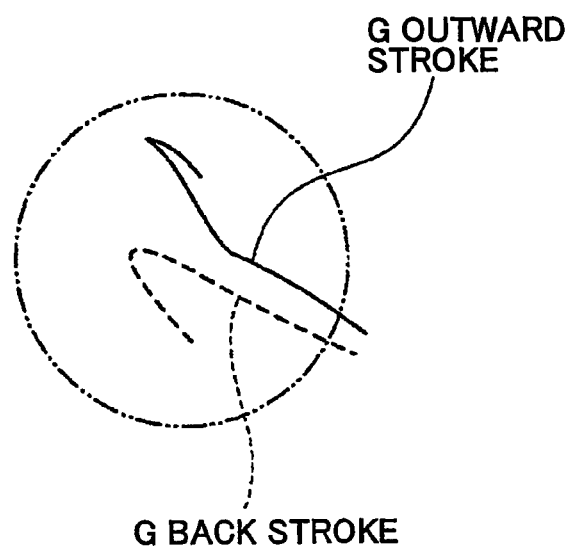
FIG. 13 is an enlarged view of the circled portion A shown in the chromaticity chart of FIG. 12.

The color difference in bidirectional printing is apt to be conspicuous as the color saturation increases. FIG. 12 is a chromaticity chart plotting color changes of typical secondary colors of red (R), green (G) and blue (B) occurring in bidirectional recording on L*a*b* chromaticity coordinates, and FIG. 13 is an enlarged view of the circled portion A. As the color saturation increases, that means, as the position becomes further away from the origin, the offset between the outward stroke and the back stroke becomes larger for each color.

In FIG. 12, the nearer the origin, the lighter the color, while the further away from the origin, the more vivid the color is. As the color becomes vivid, the offset between the outward stroke and the back stroke becomes larger. When the a* value and b* value reach a certain level, the color phase lines return toward the origin, as illustrated in FIG. 13.

In general, color difference is represented as ΔE using L*, a*, b* values. Color difference ΔE is expressed by equation (1) using a* and b* shown in FIG. 12, together with L* that is a brightness component.

$$\Delta E = [(L^*_0 - L^*_1)^2 + (a^*_0 - a^*_1)^2 + (b^*_0 - b^*_1)^2]^{1/2} \quad (1)$$

where $L^*_0$, $a^*_0$, and $b^*_0$—are the L*, a*, b* values of a reference color, and $L^*_1$, $a^*_1$, and $b^*_1$ are the L*, a*, b* values of a compared color.

Figure 14:
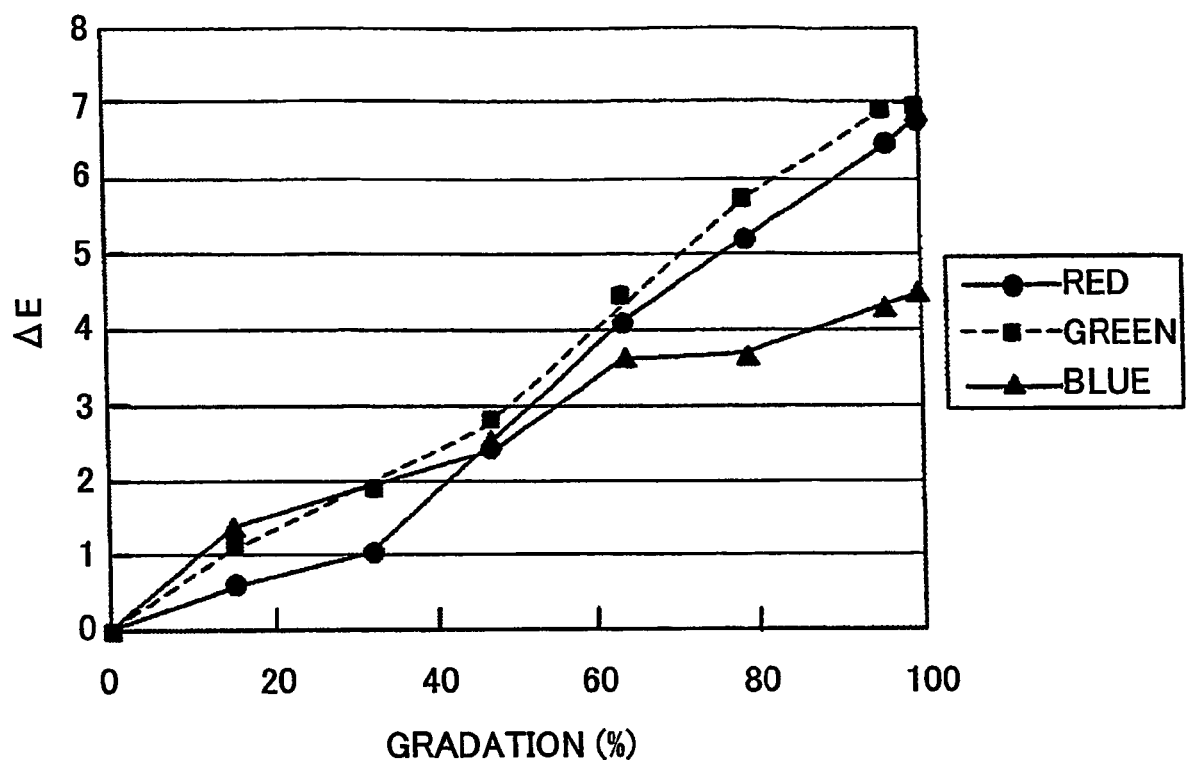
FIG. 14 is a graph of color differences ΔE of red, green and blue, as a function gradation scale (%)

FIG. 14 is a graph of the color differences ΔE of red, green, and blue, as a function of gradation scale, (%), obtained through experimental bidirectional recording using the above-described inkjet recording apparatus. As in FIG. 12, as the color tone scale (or color saturation) increases, color difference ΔE increases in the three colors.

The inventors of the present invention focused attention on the tendency of increase of color difference along with the elevation of color tone (saturation), and found that color difference in bidirectional recording can be reduced by controlling or reducing the output color levels. To control or reduce the output color levels, an input value is multiplied by a certain factor K (K<1.0) during gamma correction.

When color difference correction (or control) is not performed, the input value is supplied as it is to the gamma correction table. On the other hand, when performing color difference correction, a product of the input value and the factor K is input to the gamma correction table, and the output value from the gamma table is used for further processing.

In reducing the amount of ink adhesion, a special decimation process or forcible change of the dot size may be employed to reduce the color level. However, these processes may cause serious damage to image quality, such as degradation of gradation balance of the recorded image, lack of information due to decimation, or generation of peculiar texture patterns.

In contrast, color level control using a factor K in the gamma correction can maintain the gradation balance, and the amount of ink adhesion defining dots can be increased or decreased within the tonal range. Generation of undesirable texture can also be prevented.

The factor K is set to the optimum value taking into account the achieved effect and adverse effect. Table 1 is an evaluation scale of color difference ΔE.

From Table 1, color difference ΔE has to be set less than or equal to 0.8 (ΔE≦0.8) in order to substantially remove color difference from bidirectional recording. Consulting the relation between color difference ΔE and gradation scale (%) shown in FIG. 14, the gradation scale has to be reduced to 20% or less in theory. However, in this case, most of the original image information would be lost, and the image quality would be extremely degraded.

Figure 15A:
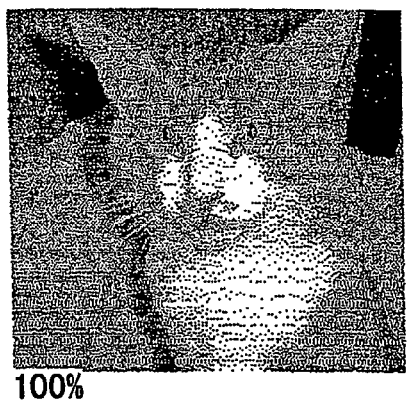
FIG. 15A is the original image of 100% color tone.
Figure 15B:
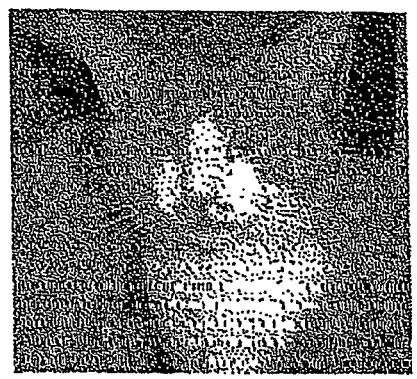
FIG. 15B is an image after the halftoning process.
Figure 16A:
FIG. 16A is the original image of 20% color tone.
Figure 16B:
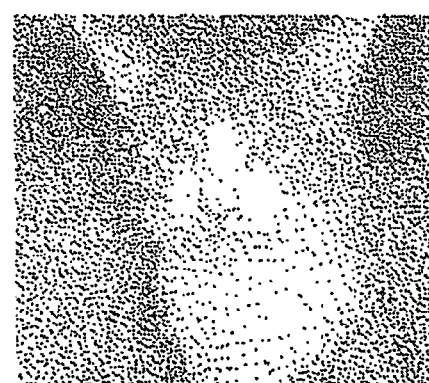
FIG. 16B is an image after the halftoning process.

If a halftoning process is performed on the original image of 100% tone scale shown in FIG. 15A, the output image becomes one shown in FIG. 15B. If the halftoning process is performed after the gradation level is reduced to 20% form the original image, as shown in FIG. 16A, then the output image cannot be recognized as illustrated in FIG. 16B.

To maintain the A tolerance level defined in Table 1, the color difference ΔE is set to 1.6 to 3.2, in which range the color difference is scarcely perceived in separated comparisons. Consulting again the relation between the color difference ΔE and gradation scale (%) shown in FIG. 14, a satisfactory image can be obtained by setting the gradation level to 35% to 65% of the original image.

Through experiment and analysis taking both degradation of image quality and improvement of color difference into

TABLE 1

| CLASS | Color Differrence ΔE | Rating | Standard |
|---|---|---|---|
| unevaluable range | 0.0 to 0.2 | Not perceptive for human eyes; Error range of special-conditioned color measuring equipment | |
| Perceptible limit | 0.2 to 0.4 | Range of reproduction accuracy of substantially conditioned color measuring equipment; Limit of perception with reproducibility for well-trained human eyes | |
| AAA tolerance | 0.4 to 0.8 | Range of setting strict color difference standard from viewpoint of reproducibility of observation judgment | JIS L0804 JIS L0805 |
| AA tolerance | 0.8 to 1.6 | Perceptible for color difference by adjacent comparison; Error range containing machine differences of general color measuring equipment | Defense standard; National Police Agency standard; General shipping inspection standard |
| A tolerance | 1.6 to 3.2 | Scarcely perceived in separated comparison; Perceived as the same color | |
| B tolerance | 3.2 to 6.5 | Treated as the same color at impression level; For paint, complained as wrong color | Color Management Tolerance of Heterogeneous Materials; JIS E3305 |
| C tolerance | 6.5 to 13 | Corresponding to color difference between color systems (such as JIS color system and Munsell color system) | JIS S6016 JIS S6024 JIS S6037 |
| D tolerance | 13 to 25 | Color difference distinctive as color system name; Beyond this, regarded as different color | | consideration, the inventors of the present invention found that improvement of color difference in bidirectional recording and degradation of image quality can be balanced with each other by setting the gradation level to 50% to 60% (or setting factor K to the range from 0.5 to 0.6).

Figure 17A:
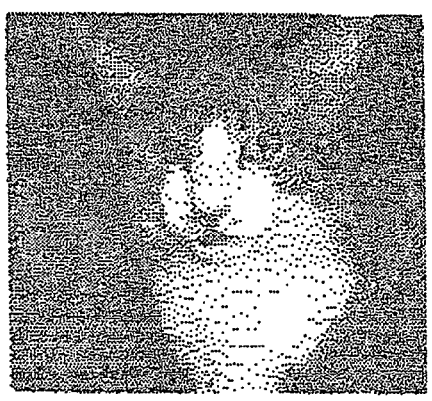
FIG. 17A is the original image of 60% color tone.
Figure 17B:
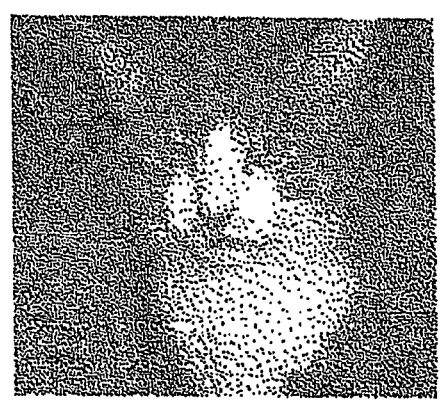
FIG. 17B is an image after the halftoning process.

FIG. 17A shows the image after the gradation control for setting the gradation level to 60% of the original image. When performing the halftoning process on the gradation controlled image, an image quality satisfactorily perceptible for the user can be obtained, as illustrated in FIG. 17B.

From the foregoing, it can be seen that the factor K used in gamma correction should be set to the range from 0.35 to 0.65, more preferably, to the range from 0.5 to 0.6 to reduce the amount of ink adhering to paper so as to prevent color difference from occurring in bidirectional recording. Although the range may slightly vary depending on the original image, the above-described range is a suitable range for achieving satisfactory image quality. With this range of gradation level, the color difference reducing effect corresponding to at least the level-A tolerance shown in Table 1 can be expected, and high-speed, high-quality recording operations can be realized in inkjet recording apparatuses under little influence of color difference in bidirectional recording.

In this embodiment, the input data value is multiplied by factor K in order to achieve improvement. However, as has been explained above, influence on the image quality may vary depending on the contents of the image data. In FIG. 15 through FIG. 17, gamma correction using factor K is carried out on photographic image data. For text data, degradation of image quality may become more conspicuous.

This is because text data are reproduced in terms of "line", in contrast to images expressed in terms of "face". Even if the text data are reproduced exactly as intended by the halftoning process, letters and symbols may not be legible due to decimation of several dots. Furthermore, in evaluating printed text from the standpoint of color difference in bidirectional recording, such color difference is inconspicuous in printed text, which is captured as "lines", unlike picture images captured as "faces".

This means that it is desirable not to perform the control process of reducing the amount of ink adhesion if the object of the input data is text. There are other types of objects, such as graphics, including charts and figures often used in materials pertinent to business. Since graphics data represent information by "face", just like pictures or photographs, they are treated as image data, similarly to pictures and photographs in the embodiment.

Figure 18:
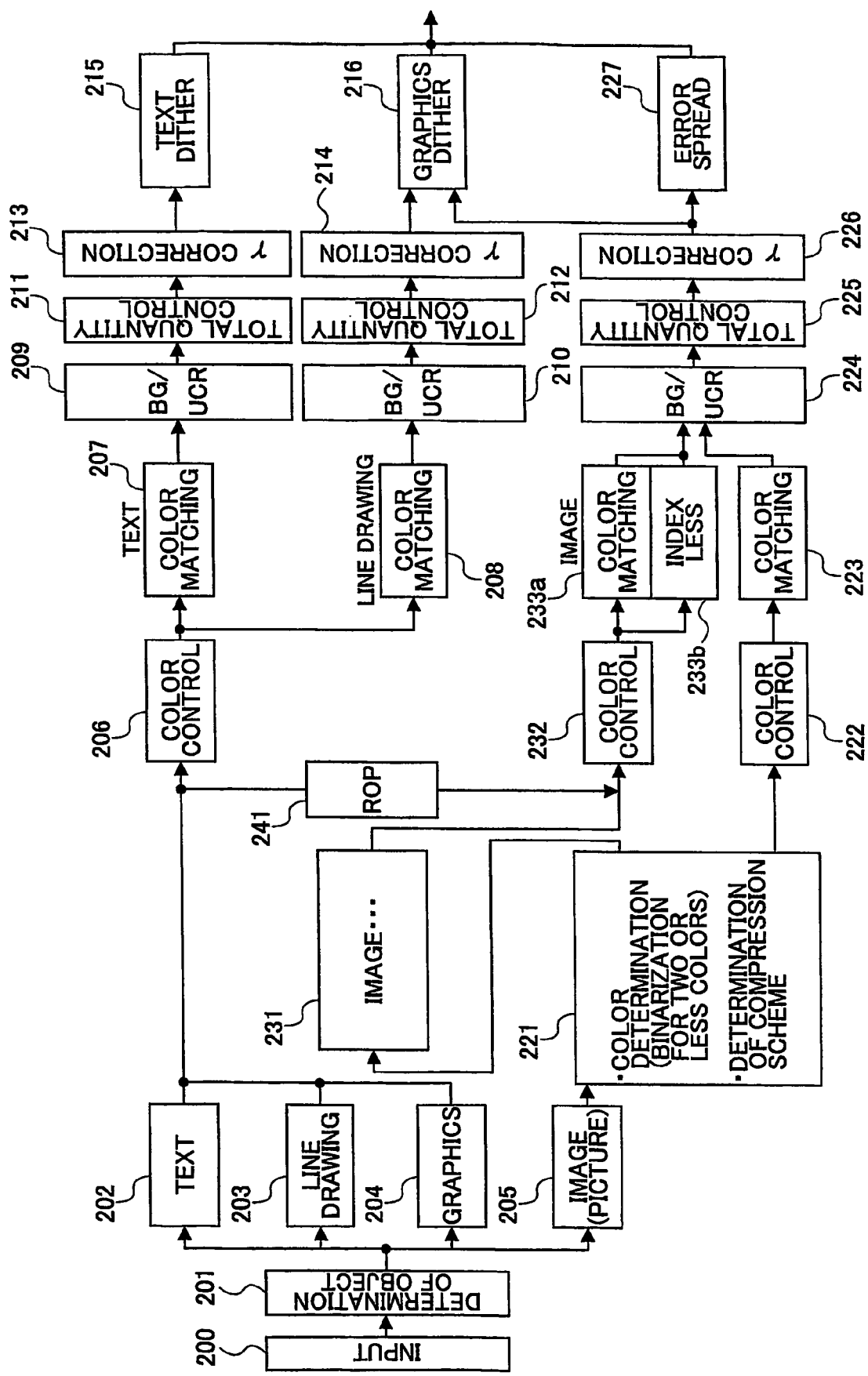
FIG. 18 is a block diagram showing the data flow in the printer driver.

FIG. 18 is a block diagram showing the data flow in the printer driver 91 that performs the ink adhering amount control process. When a "print" command is generated by the application software operating on a data processing apparatus 90 (e.g., a personal computer), the object determination unit 201 of the printer driver 91 determines the type of object of the input data 200, such as text 202, line drawing 203, graphics 204, and image (picture) 205. Each object is to be subjected to associated processes through a corresponding route.

Text data 202, line drawing data 203, and graphics data 204 are subjected to color control 206. The text data 202 are further subjected to color matching 207, BG/UCR processing 209, total quantity control 211, gamma correction 213, and text dither (halftone) processing 215. The line drawing data 203 and graphics data 204 are further subjected to color matching 208, BG/UCR processing 210, total quantity control 212, gamma correction 214, and graphics dither (halftone) processing 216.

For image data 205, color determination and compression scheme determination are performed in unit determination 221. In the regular mode, the image data 205 are further subjected to color control 222, color matching 223, BG/UCR processing 224, total quantity control 225, gamma correction 226, and error spread (halftone) processing 227. If the number of colors in the image data 205 is two or less, image decimation 231 and color control 232 are performed. Then, either color matching 233a or indexless processing (for not conducting color matching) 233b is conducted. The image data 205 consisting of two or less colors are further subjected to BG/UCR processing 224, total quantity control 225, gamma correction 226, and error spread (halftone) processing 227.

Line drawing data 203 and graphics data 204 may be supplied to image color control unit 232 via ROP processing unit 241, instead of being supplied to color control unit 206.

The image data items processed for the respective objects are synthesized and supplied to a recording apparatus.

In the embodiment, the amount of ink adhesion is controlled or reduced for graphics data and image data by gamma correction units 214 and 226 to reduce color difference in bidirectional recording. On the other hand, the gamma correction unit 213 performs ordinary gamma correction, without reducing the amount of ink adhesion, for text data.

Figure 19:
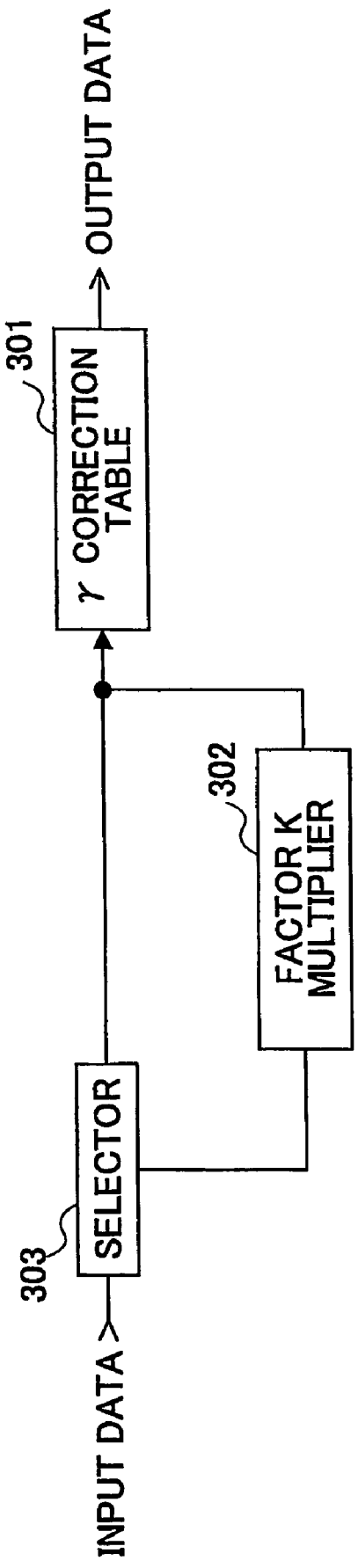
FIG. 19 is a diagram illustrating an example of gamma correction according to the first embodiment.

FIG. 19 shows an example of gamma correction performed by the printer driver 91 according to the first embodiment. To perform ink adhesion control for reducing color difference in bidirectional recording, input data are supplied to a factor K multiplier 303. The input data values are multiplied by factor K, and then supplied to a gamma correction table 301. On the other hand, if the input data do not require ink adhesion control, the input data are supplied directly to the gamma correction table 301. A selector 303 determined whether the input, data are to be supplied directly to the gamma correction table 301 or to the factor K multiplier 302.

Gamma correction is a process for converting the gradation level of the input data to a different gradation level taking the image forming characteristics of the recording apparatus into consideration. The input data are data that are to be subjected to gamma correction, and they may or may not have been subjected to necessary processes (such as a CMM process or a BG/UCR process). The output data are data that have been subjected to the gamma correction.

If color difference control in bidirectional recording is not performed, the input data are supplied directly to the gamma correction table 301, and subjected to gamma correction using an ordinary gamma value, and the data having been subjected to ordinary gamma correction are output. On the other hand, to control or reduce color difference in bidierctional recording, the input data vales are multiplied by factor K at the factor K multiplier 302, and the adjusted input data are supplied to the gamma correction table 301, in which gamma correction is performed using an ordinary gamma correction value. The resultant output data have been adjusted so as to reduce the color difference in bidirectional recording. This process is equivalent to performing gamma correction on the input data using a gamma value multiplied by factor K (that is, a controlled gamma value) in order to reduce color difference in bidirectional recording.

The factor K is set in the range from 0.35 to 0.65. Since the input data values are multiplied by factor K, the data values that are to be subjected to gamma correction at the gamma correction table 301 are already reduced, as compared with those values directly supplied to the gamma correction table 301, and the amount ink adhering to paper can be reduced.

In the example shown in FIG. 19, a single gamma correction table 301 is used in common for both the color difference control process and the ordinary gamma correction process, and data values input to the gamma correction table 301 are adjusted depending on whether the color difference control is to be performed on the input data. However, two different gamma tables having different gamma values may be employed.

Figure 20:
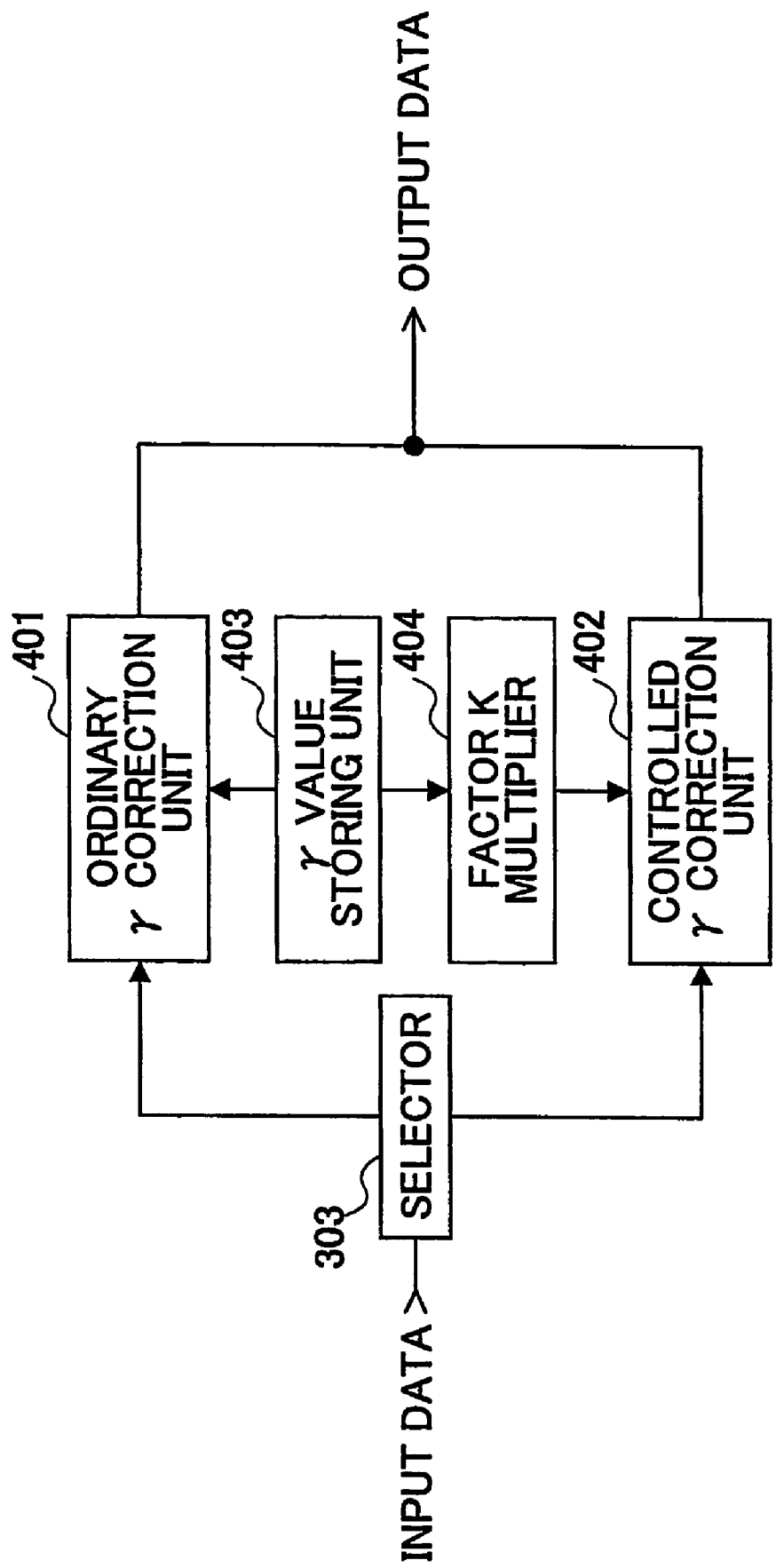
FIG. 20 is a diagram illustrating another example of gamma correction.

FIG. 20 illustrates a modification of the gamma correction part for reducing color difference in bidirectional recording. The gamma correction part comprises an ordinary gamma correction unit 401, a controlled gamma correction unit 402, a gamma value storing unit 403, a factor K multiplier 404, and a selector 303. The ordinary gamma correction unit 401 performs ordinary gamma correction on the input data, without controlling the amount of ink adhesion to reduce color difference in bidirectional recording. The controlled gamma correction unit 402 performs controlled gamma correction, adjusting the amount of ink adhesion so as to reduce color difference in bidirectional recording. The gamma value storing unit 403 stores gamma values used in the ordinary gamma correction (which are referred to as "ordinary gamma values"). The factor K multiplier 404 multiplies an ordinary gamma value stored in the gamma value storing unit 403 by a factor K and supplies the controlled gamma value to the controlled gamma correction unit 402. The selector 303 supplies the input data to either the ordinary gamma correction unit 401 or the controlled gamma correction unit 402.

The selector 303 is installed in the printer driver 91, and therefore, the user can adjust the installation of the selector 303. For example, if decrease of gradation level is more serious han color difference, then the user can set the selector 303 so as not to select controlled gamma correction.

If a recommended setting mode for realizing the optimum image quality determined by a maker or an automatic setting mode for conducting the optimum installation determined by the printer driver 91 through image data analysis is loaded in the printer driver 91, the selector may be configured to determine the presence or absence of "color difference control in bidirectional recording" in its selecting operation.

If a single color of ink (black or any color) is used, color difference due to bidirectional recording does not occur in principle. In this case, a mode for "not performing color difference control in bidirectional recording" may be automatically set.

If the object type determined by the object type determination unit (see FIG. 18) is text, then ordinary gamma correction is carried out, without color difference control in bidirectional recording. Similarly, if the number of ink colors used in recording is one, then ordinary gamma correction is carried out, without reducing color difference in bidirectional recording.

FIG. 21 is a diagram showing different types of data processing implemented for different types of data objects, and image synthesis of these data objects. In FIG. 21, a graphics halftoning process is implemented for graphics data using a controlled gamma value obtained by multiplying the ordinary gamma value by factor K, and a text halftoning process is implemented for color text data (other than black) using the ordinary gamma value. For monochrome (or black) text, only jaggy correction (i.e., an anti-aliasing process) is carried out. Then, the graphics, color text, and monochromic (black) text are synthesized to reproduce an image.

By controlling the amount of ink adhesion so as to reduce color difference in bidirectional recording, the image quality can be maintained, while preventing color difference, in the bidirectional printing mode for increasing the recording rate. In other words, a high-speed, a high quality recording can be realized achieving a balance between the image quality and the recording rate.

When the object to be output is text, the ordinary gamma correction is conducted without multiplication of factor K, thereby preventing the image quality of text from degrading to an undesirable level. Similarly, when the object to be output is not text, and when a single color of ink is used, again the ordinary gamma correction is conducted without reducing the amount of ink adhesion because color difference in bidirecitional recording does not occur in principle in a single color recording operation.

By controlling the amount of ink adhesion through gamma correction using a controlled gamma value, the gradation level is adjusted, while maintaining the gradation balance. The number of dots is increased or reduced within the range of gradation representation, and occurrence of unintended texture is prevented.

The controlled gamma value used in the controlled gamma correction for reducing color difference in bidirectional recording is obtained by multiplying the ordinary gamma value by a factor K (K<1). By setting the value of factor K to the range from 0.35 to 0.65, the color difference in bidirectional recording can be reduced efficiently, while preventing degradation of image quality due to decrease of gradation level. Especially, by setting the value of K to the range from 0.5 to 0.6, color difference in bidirectional recording is substantially eliminated, while reducing the adverse effect of drop of gradation level to the minimum, and a satisfactory high-speed recording image can be reproduced.

The total ink consumption of color inks is set to be substantially equal to the ink consumption of black ink. This arrangement extends the replacement cycle of color ink cartridges, and reduces cost. In offices, so-called business documents containing text and graphics are mainly output. With the inkjet recording apparatus of this embodiment, ink consumption can be reduced in printing graphics (such as a chart) and pictures (or photographs), while printing text portions without reducing the ink quantity.

In general, text is printed in black, and graphics and pictures are printed with color inks. Since, with the present invention, the consumption of black ink is substantially the same as the total consumption of color inks (C+M+Y), it is unnecessary to often replace color ink cartridges, unlike the conventional technique.

Some known apparatuses are furnished with an ink saving mode and vary image processing for each object. The inkjet recording apparatus of this embodiment does not require such ink saving mode, but the ink consumption can be reduced as a secondary effect of the color difference control operation in bidirectional printing.

The first embodiment of the present invention can be applied not only to an inkjet recording apparatus, but also to pinters, facsimile machines, copy machines, and printer/facsimile/copier multifunction machines for reproducing images using inks. The first embodiment of the present invention can also be applied to image reproducing/forming apparatuses using a recording liquid other than ink, data processing apparatuses, and printer drivers loaded in the data processing apparatuses.

In the above-described embodiment gamma correction and controlled gamma correction for reducing color difference in bidirectional recording are implemented by the printer driver installed in a host computer. However, the gamma correction and controlled gamma correction may be performed by the inkjet recording apparatus. In this case, the gamma correction process 133 shown in FIG. 7 is incorporated in the controller 100 of the inkjet recording apparatus. Alternatively, the entire data flow shown in FIG. 18 may be performed in the inkjet recording apparatus.

Figure 22:
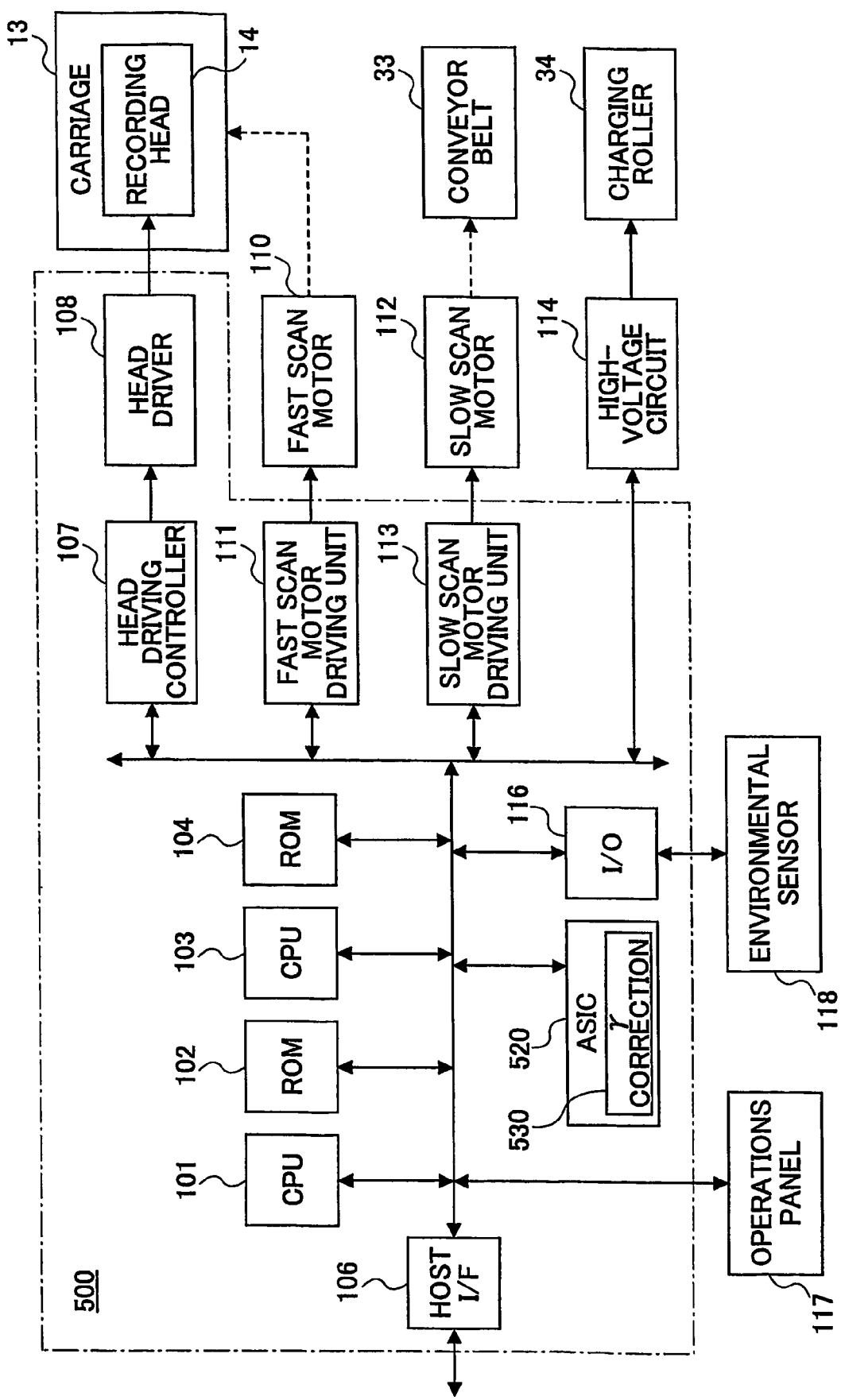
FIG. 22 is a block diagram of the control unit of the image reproducing and forming apparatus according to the second embodiment of the invention.

FIG. 22 is a block diagram of controller 500 of the inkjet recording apparatus (as an example of image reproducing/forming apparatus) according to the second embodiment of the invention. In the second embodiment, the amount of ink adhesion is controlled so as to reduce leakage of electric charge and to conduct satisfactory duplexing print. Accordingly, the inkjet recording apparatus is not necessarily a bidirectional recording apparatus.

Similar to the first embodiment, the recording head 14 is driven in response to pixel signals, while the paper on the rotating conveyor belt 33 is transported. To be more precise, as illustrated in FIG. 2A, a line of an image is recorded on the paper by ejecting ink droplets onto the paper held stationary on the conveyor belt 33 at a prescribed position. Then, the paper 3 is fed by a prescribed distance to carry out the recording operation for the next line of the image. The recording operation for this page is finished when the recording head 14 receives a job termination signal or when the trailing edge of the paper 3 is detected in the recording area.

Returning to FIG. 22, the control unit 500 includes a CPU 101 for controlling the overall operation of the inkjet recording apparatus 1, a ROM 102 for storing programs executed by the CPU 101 and other fixed data, a RAM 103 for temporarily storing pixel data, a nonvolatile memory (NVRAM) 104 for retaining data during shutdown of the power supply, and an ASIC 520. The ASIC 520 implements various types of signal processing, including gamma (γ) correction for adjusting the amount of ink adhering to the recording medium carried out at gamma correction processing unit 119 according to the invention. The ASIC 520 implements image processing, rearrangement of the processed print data, signal processing of input/output control signals, etc.

The control unit 100 also includes an interface (I/F) 106 for conducting data transfer to and from a host computer (not shown), a head driver 108 for driving the recording head 14, and a head driving controller 107 for controlling the head driver 108. The control unit 100 also includes a fast scan motor driving unit 111 for driving a fast scan motor 110, and a slow scan motor driving unit 113 for driving a slow scan motor 112. The control unit 100 has an input/output unit 116 for receiving various detecting signals from the environmental sensor 118 for detecting the environmental temperature or humidity and other sensors (not shown).

An operations panel 117 is connected to the control unit 100. Necessary information is displayed on the operations panel 117, and it allows a user to input information required for the operations of the inkjet recording apparatus. A high-voltage circuit (or power supply) 114 for applying a high voltage to the charging roller 34 is also connected to the control unit 100, and the control unit 100 controls the ON/OFF switching and the polarity of the high voltage circuit 114.

The control unit 100 receives print data at the interface 106 from an external apparatus via a cable or a network, and temporarily stores the print data in a buffer (not shown) of the interface 106. Such an external apparatus includes information processors (such as personal computers), image readers (such as image scanners), and image pickup apparatuses (such as digital cameras).

The CPU 101 reads the print data from the buffer of the interface 106, and analyzes the print data. The ASIC 520 (including the gamma correction processing unit 530) executes necessary image processing operations, such as CCM processing, BG/UCR processing, and gamma correction. Then, the ASIC 520 rearranges the processed print data (pixel data), and supplies the pixel data to the head driving controller 107. Conversion of the print data into bitmap data used for outputting the image may be carried out using font data stored in the ROM 102.

Alternatively, the image data may be developed into bitmap data by the printer driver of a host computer, and the bitmap data may be supplied externally to the control unit 100 of the inkjet recording apparatus 1.

The head driving controller 107 receives a line of pixel data (dot pattern data) corresponding to a scanning line of the recording head 14, and outputs serial data to the head driver 108 synchronized with a clock signal. The head driving controller 107 also outputs a latch signal to the head driver 108 at prescribed timing.

The head driving controller 107 includes a ROM for storing pattern data for driving pulses, and a driving pulse generating circuit for producing a driving pulse based on the pattern data read from the ROM. The pattern data for driving pulses may be stored in ROM 102. The driving pulse generating circuit includes a digital-to-analog converter for converting the pattern data read from the ROM into an analog format, and an amplifier.

The head driver 108 includes a shift register that receives the clock signal and the serial pixel data from the head driving controller 107, a latch circuit that latches the register value of the shift register at timing of a latch signal supplied from the head driving controller 107, and a level shifter for shifting the level of the output value from the latch circuit. The head driver 108 also includes an analog switch array, the ON/OFF operation of which is controlled by the level shifter. Based on the ON/OFF control of the analog switch array, a desired driving pulse is applied selectively to the actuator of the recording head 14 to drive the head.

Figure 23:
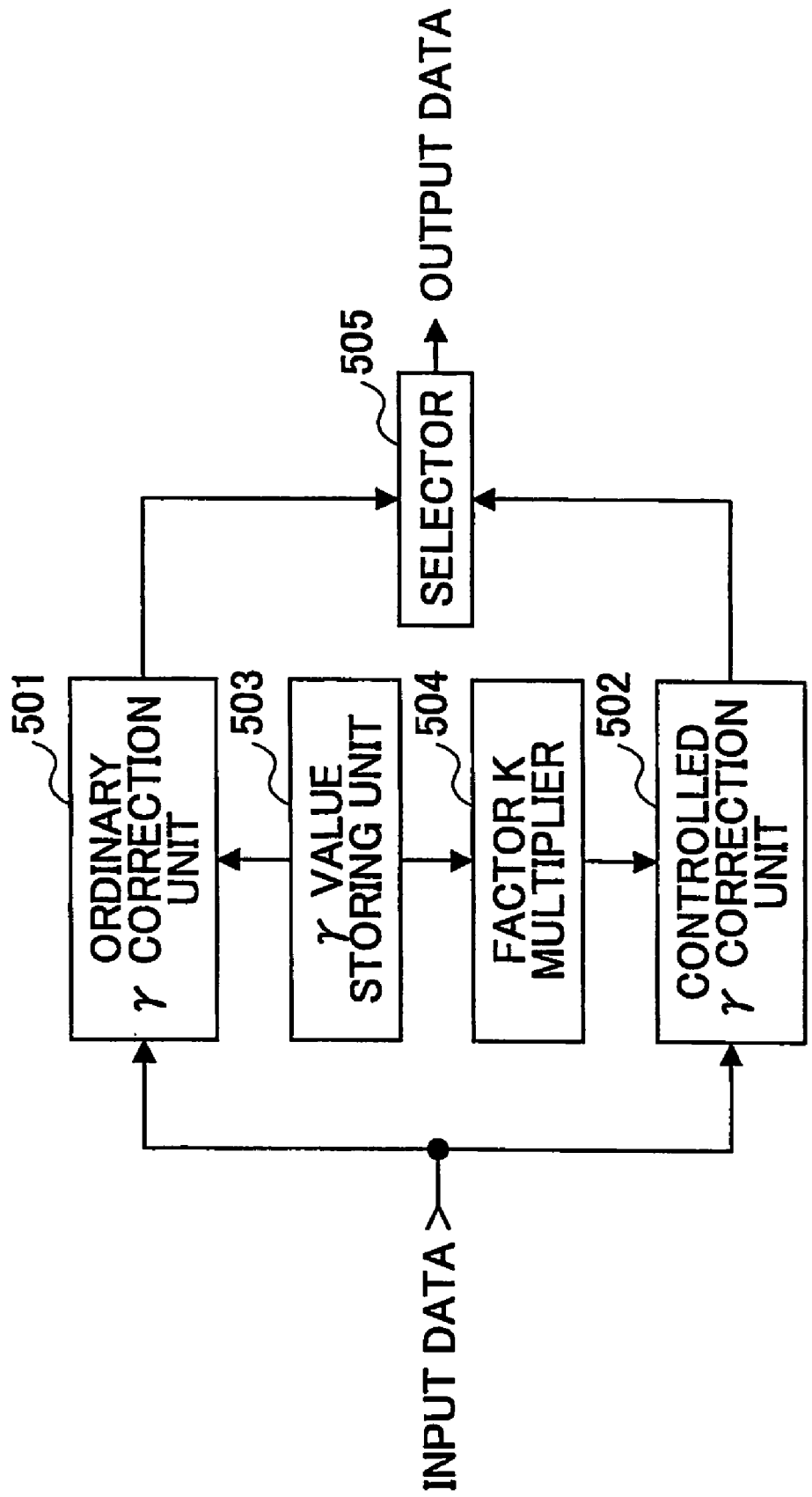
FIG. 23 is a diagram illustrating an example of gamma correction according to the second embodiment of the invention.

FIG. 23 is a schematic block diagram of the gamma correction processing unit 530 according to an embodiment of the invention. The gamma correction processing unit 530 includes an ordinary gamma correction unit 501 configured to carry out ordinary gamma correction not taking into account prevention of electric charge on paper or a recording medium, and a controlled (or leakage preventing) gamma correction unit 502 configured to carry out gamma correction for reducing the quantity of liquid droplets adhering on paper to prevent leakage of electric charge on paper. A gamma value storing unit 503 stores ordinary gamma values used in ordinary gamma correction. A factor K multiplier 504 multiplies the ordinary gamma value by factor K (K<1.0), and outputs the product (controlled gamma value) to the controlled gamma correction unit 502. A selector 505 selects as output data either the first gamma-corrected data from the ordinary gamma correction unit 501 or the second gamma-corrected data from the controlled gamma correction unit 502.

In this context, the gamma correction is a process for converting the gray-scale level of the input data to another gray-scale level taking into account the image pickup characteristic of the inkjet recording apparatus. The input data are data that have not been subjected to gamma correction, and that may or may not have been subjected to other typed of data processing, such as CCM processing or BG/UCR processing. The output data from the gamma correction processing unit 530 are data that have been subjected to gamma correction.

In the second embodiment, the controlled gamma correction unit 502 performs gamma correction on the input data using a controlled gamma value obtained by multiplying the ordinary gamma value by factor K (K<1.0) adjusted so as to prevent leakage of electric charge from the paper and the electrostatic attraction belt. The controlled gamma value used in the controlled gamma correction unit 502 is generally smaller than the ordinary gamma value, and therefore, the amount of ink adhering to paper is reduced.

By reducing the amount of ink (liquid) adhering to paper, leakage of electric charges caused by excessive amount of moisture on paper is prevented. Consequently, electrostatic attraction between the paper and the conveyor belt 33 is maintained appropriately, and paper is transported in a stable manner. In addition, the accuracy of the landing position of the ink droplet is maintained high, and the image quality is improved.

When an image is formed on paper held by electrostatic attraction by ejecting ink droplets or other types of liquid droplets onto the paper, the possibility of leakage of electric charge always exists due to the moisture of the ink droplets adhering to the paper. Even if drying means for promoting evaporation of the moisture component is furnished, electric charges that have been lost during the recording (printing) operations cannot be recovered. Accordingly, it is more advantageous to reduce the quantity of ink droplets that adheres. This arrangement can be effectively applied to prior art techniques disclosed in, for example, JP 2001-235945A and JP 2000-190473A, regardless of whether means for applying electric charges to paper is furnished (JP 2001-235945A) or not furnished (JP 2000-190473A).

Even if the image density is slightly reduced by using a controlled gamma value as a product of the ordinary gamma value and factor K less than 1.0, the quality of the printed image is not adversely affected very much because the overall balance of brightness of color, which has greater influence to the visual characteristic than density, is maintained.

Although in the example shown in FIG. 23 either pixel data subjected to ordinary gamma correction at the ordinary gamma correction unit 501 or pixel data subjected to controlled gamma correction at controlled gamma correction unit 501 is selected by the selector 505, the input data may be selectively supplied to either the ordinary gamma correction unit 501 or the controlled gamma correction unit 502.

By allowing selection between ordinary gamma correction and controlled gamma correction, gamma correction is carried out in the appropriate mode depending on the type and/or the material of paper. For example, when thick paper or surface-coated paper is used, ordinary gamma correction is carried out at the original density, using an ordinary gamma value giving priority to the image quality, because such paper prevents the moisture component of the ink from reaching the back face and leakage of electric charge is unlikely to occur. On the other hand, when plain paper that is likely to cause leakage of electric charge is used, controlled gamma correction is selected using a controlled gamma value to prevent in advance the image quality from degrading due to leakage of electric charge and reduction of electrostatic attraction.

Figure 24:
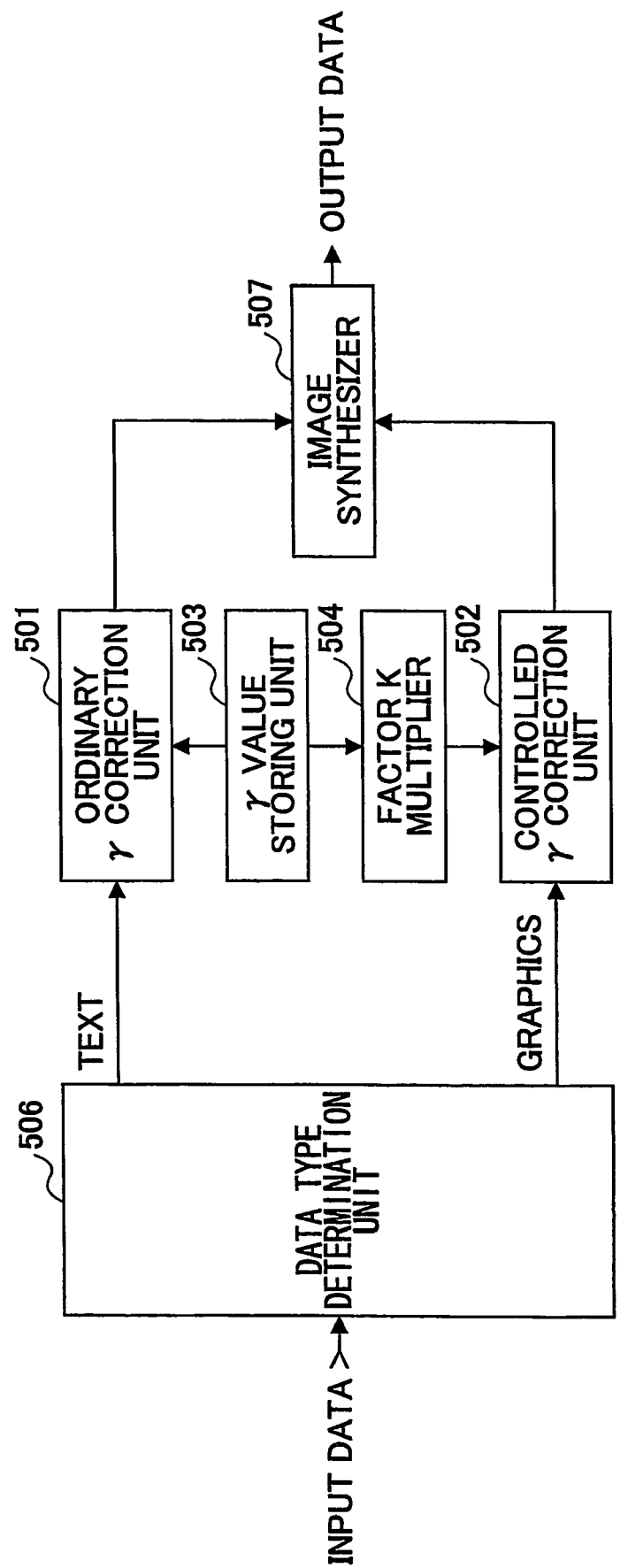
FIG. 24 is a diagram illustrating another example of gamma correction.

FIG. 24 illustrates another example of the gamma correction processing unit 530 according to the second embodiment. In this example, a data type determination unit 506 is provided to determine the type of input data. Depending on the data type, appropriate one of the ordinary gamma correction and the controlled gamma correction is carried out.

In the specific example shown in FIG. 24, the data type determination unit 506 determines whether the input data are text data or graphics data. The data type determination unit 506 supplies text data to the ordinary gamma correction unit 501, while supplying graphics data to the controlled gamma correction unit 502.

In addition, an image synthesizer 507 is provided to synthesize the output data from the ordinary gamma correction unit 501, which have been subjected to ordinary gamma correction, and the output data from the controlled gamma correction unit 502, which have been subjected to controlled gamma correction.

Although in this example graphic data are always supplied to the controlled gamma correction unit 502, the gamma correction processing unit 530 may be configured such that ordinary gamma correction or controlled gamma correction is selectively carried out on the graphics data depending on, for example, the type of paper, as in the first example explained in conjunction with FIG. 4. In addition, the value of the factor K may be changed depending on the data type.

When multiplying the ordinary gamma value by a constant factor K (K<1.0), the image density of the printed data is slightly reduced because the amount of ink adhering to paper is reduced based on the controlled gamma value. The influence of reduction of the image density differs depending on data objects. For example, lowering the image density is more risky in printing text data because image quality or legibility is more likely to be degraded, while contribution to leakage prevention is not so great because the quantity of ink used to print text data is inherently small (leaving more non-printed areas on the paper). On the other hand, in printing graphics data, the visual characteristic is not degraded very much as long as the brightness balance is maintained. Contribution to leakage prevention is greater because the ink consumption in printing graphics is greater with less non-printed areas on the paper.

Accordingly, print data objects are grouped depending on the type, such as text data whose information value is likely to be degraded along with reduction of the density and graphics data items that allow reduction of the density to a certain extent. Gamma correction is performed using different gamma values, namely, an ordinary gamma value and a controlled gamma value obtained by multiplying the ordinary gamma value by factor K. The value of factor K itself may be varied to produce the controlled gamma value.

Data items with priority given to the image quality (such as text data) are printed without reducing the amount of ink adhering to paper, and data items that can accept reduction of color density to a certain degree are printed with reduced amount of ink adhering to the paper, balancing the image quality with prevention of leakage of electric charge.

In general, text data are printed using a single color of ink (generally with black ink), while graphics data are printed using cyan, magenta, yellow, and black inks simultaneously. By switching the gamma correction mode between ordinary gamma correction and controlled gamma correction depending on the object type, satisfactory output images can be obtained with less ink consumption, while maintaining the image quality, and running cost is reduced.

An example of a developed model of this example is explained with reference to FIG. 21 and FIG. 25. In FIG. 21, a graphics halftoning process is implemented for graphics data using a controlled gamma value obtained by multiplying the ordinary (original) gamma value by factor K, and a text halftoning process is implemented for color text data using the ordinary gamma value, as in the first embodiment. For monochrome (or black) text, only jaggy correction (i.e., an anti-aliasing process) is carried out. Then, the graphics, color text, and monochromic (black) text are synthesized to reproduce an image.

Figure 25:
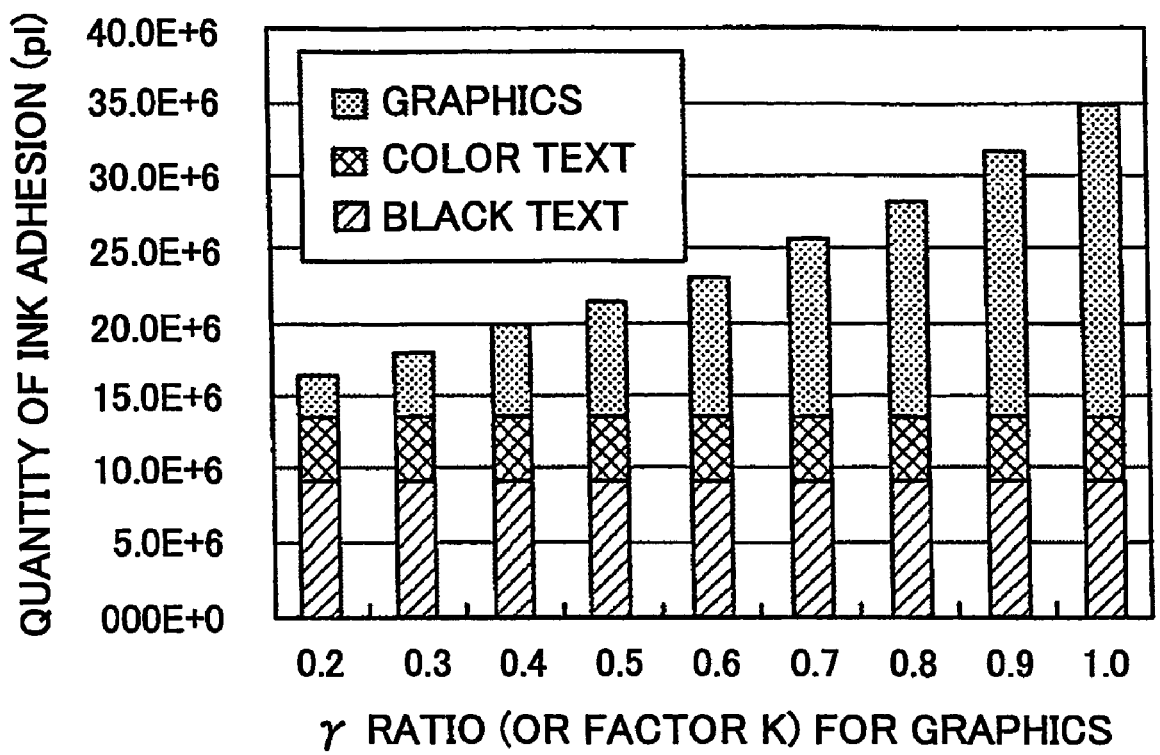
FIG. 25 is a chart showing amount of ink adhesion, as well as data composition in ink adhesion, with varying gamma ratio (or factor K) for processing graphics data.

FIG. 25 is a chart showing the amount of ink adhesion, as well as data composition in ink adhesion, with varying, gamma ratios (or factor K) for processing graphics data. As the gamma value (or factor K) decreases, the amount of ink adhesion of graphics data decreases.

Figure 26:
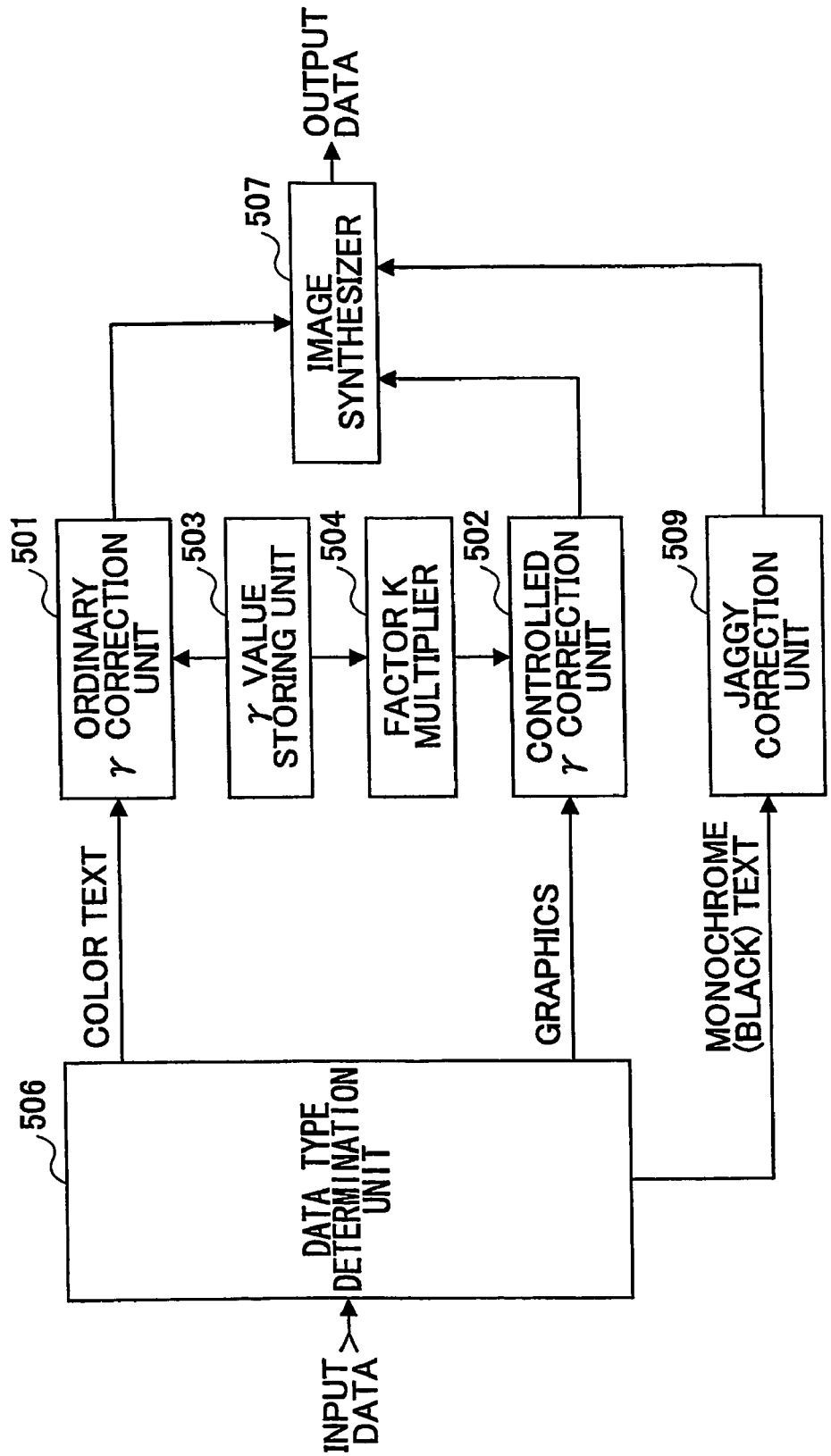
FIG. 26 is a diagram illustrating still another example of gamma correction, which is suitable for image synthesis shown in FIG. 24.

FIG. 26 illustrates a modification of the gamma correction processing unit of the second example, suitable for the developed model shown in FIG. 21. The data type determination unit 506 determines the data type among graphics, color text, and black text, for example. Color text data are supplied to the ordinary gamma correction unit 501, and subjected to ordinary gamma correction using an ordinary gamma value stored in the gamma value storing unit 503. Graphics data are supplied to the controlled gamma correction unit 502, and subjected to controlled gamma correction using a controlled gamma value supplied from the factor K multiplier 504. Monochrome (black) text data are supplied to the jaggy correction unit 509. The data items having been subjected to the associated processes are synthesized by the image synthesizer 507.

Figure 27:
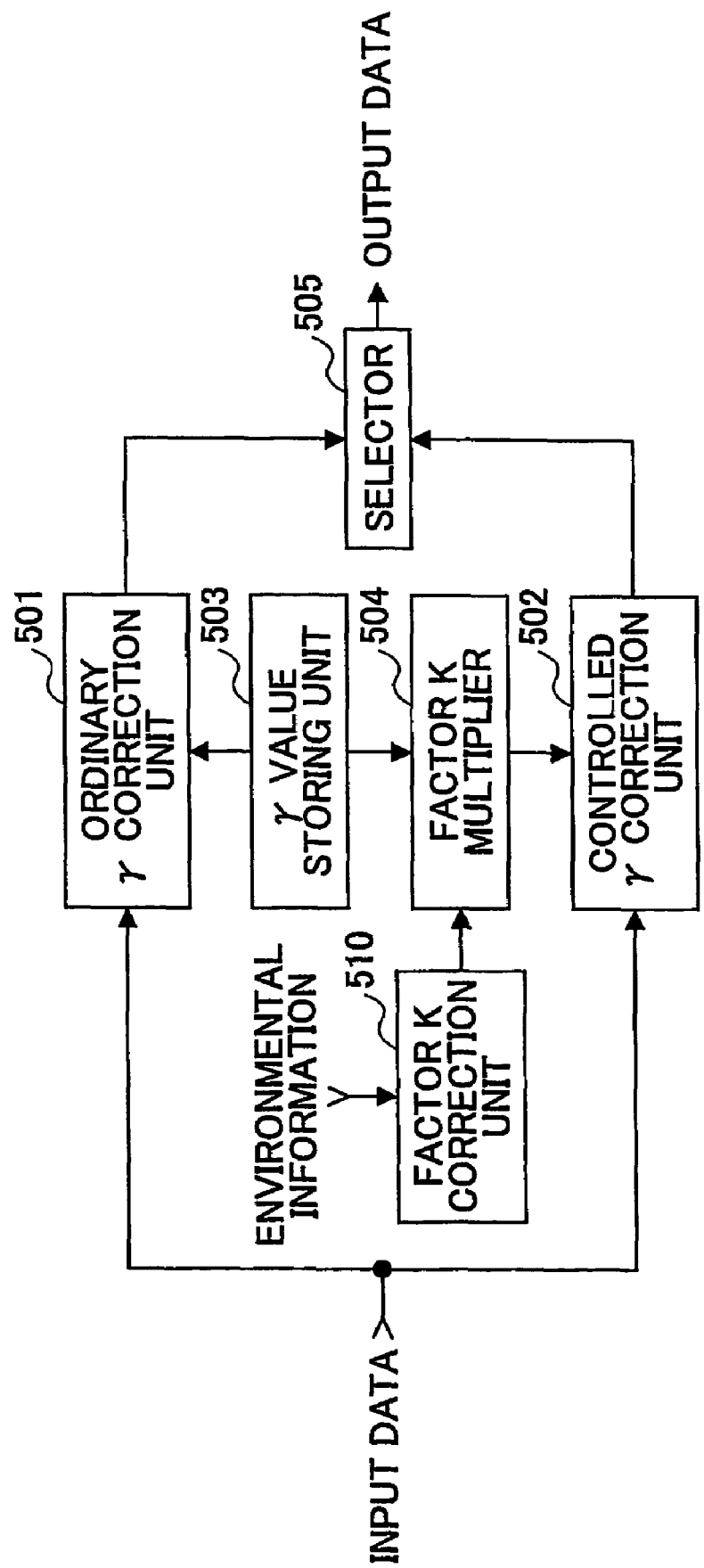
FIG. 27 is a diagram illustrating yet another example of gamma correction.

FIG. 27 illustrates a still another example of the gamma correction processing unit 530 according to the second embodiment of the invention. In the third example, a factor K correction unit 210 is furnished to adjust the value of factor K used in the factor K multiplier 504 based on the environmental conditions detected by the environmental sensor 118 (see. FIG. 5). This arrangement is applicable to the second example shown in FIG. 24 and the modification shown in FIG. 26.

Leakage of electric charge from paper is apt to change depending on the environmental conditions. In general, when the humidity is high, electric charges are likely to leak due to the moisture absorbed in the paper. On the other hand, when the humidity is low, leakage of electric charge is less likely to occur.

In view of such environmental changes, the value of factor K is modified (or corrected) according to the environmental conditions. For example, factor K is made smaller to reduce the amount of ink adhering to paper at high humidity, thereby preventing leakage of electric charge and maintaining electrostatic attraction between the paper 3 and the conveyor belt 33. On the other hand, the value of factor K is set closer to 1.0 when the humidity is low, thereby maintaining the image quality high.

The selector 505 outputs selectively either the data item having been subjected to controlled gamma correction using a controlled gamma value multiplied by a corrected value of factor K or the data item having been subjected to ordinary gamma correction.

Figure 28:
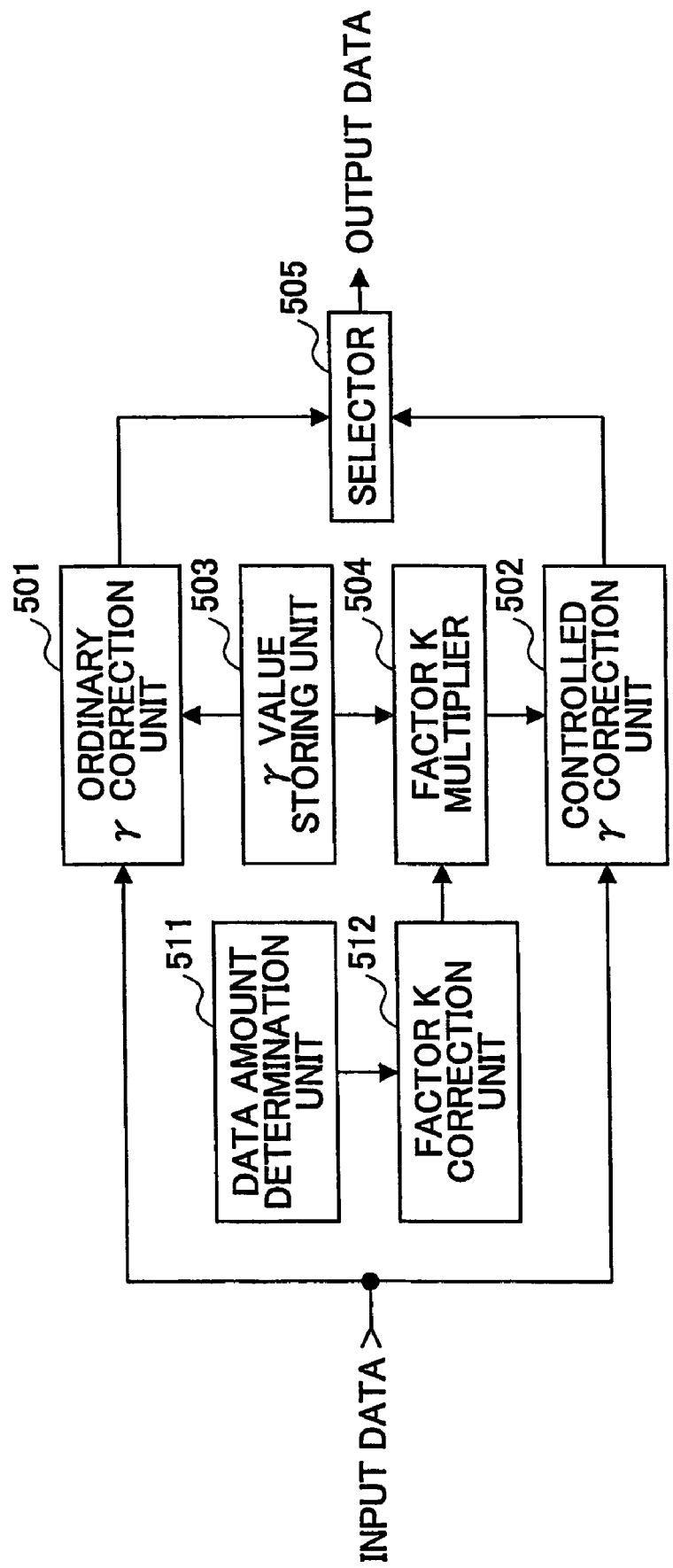
FIG. 28 is a diagram illustrating yet another example of gamma correction.

FIG. 28 illustrates a yet another example of the gamma correction processing unit according to the second embodiment of the invention. In this example, the gamma correction processing unit 530 is furnished with a data amount determination unit 511 that determines the amount of data output for a page and a factor K correction unit 512 that adjusts the value of factor K used in the factor K multiplier 504 in response to the determination result of the data amount determination unit 511.

When the total amount of data output for a page is small, leakage of electric charge due to ink adhesion does not greatly affect electrostatic attraction or the resultant printed image. For example, when an image is printed only at a corner of the paper, the amount of ink adhesion itself is small, and consequently, leakage of electric charge is not serious.

In view of this situation, the amount of data output for a page is determined to adjust the value of factor K depending on the data amount. When the amount of data for a page is small, the factor K is set closer to 1.0 (such that the controlled gamma value approaches the ordinary gamma value) to improve the image quality. This arrangement allows the quality of the printed image to be balanced with the prevention of leakage of electric charge.

Figure 29:
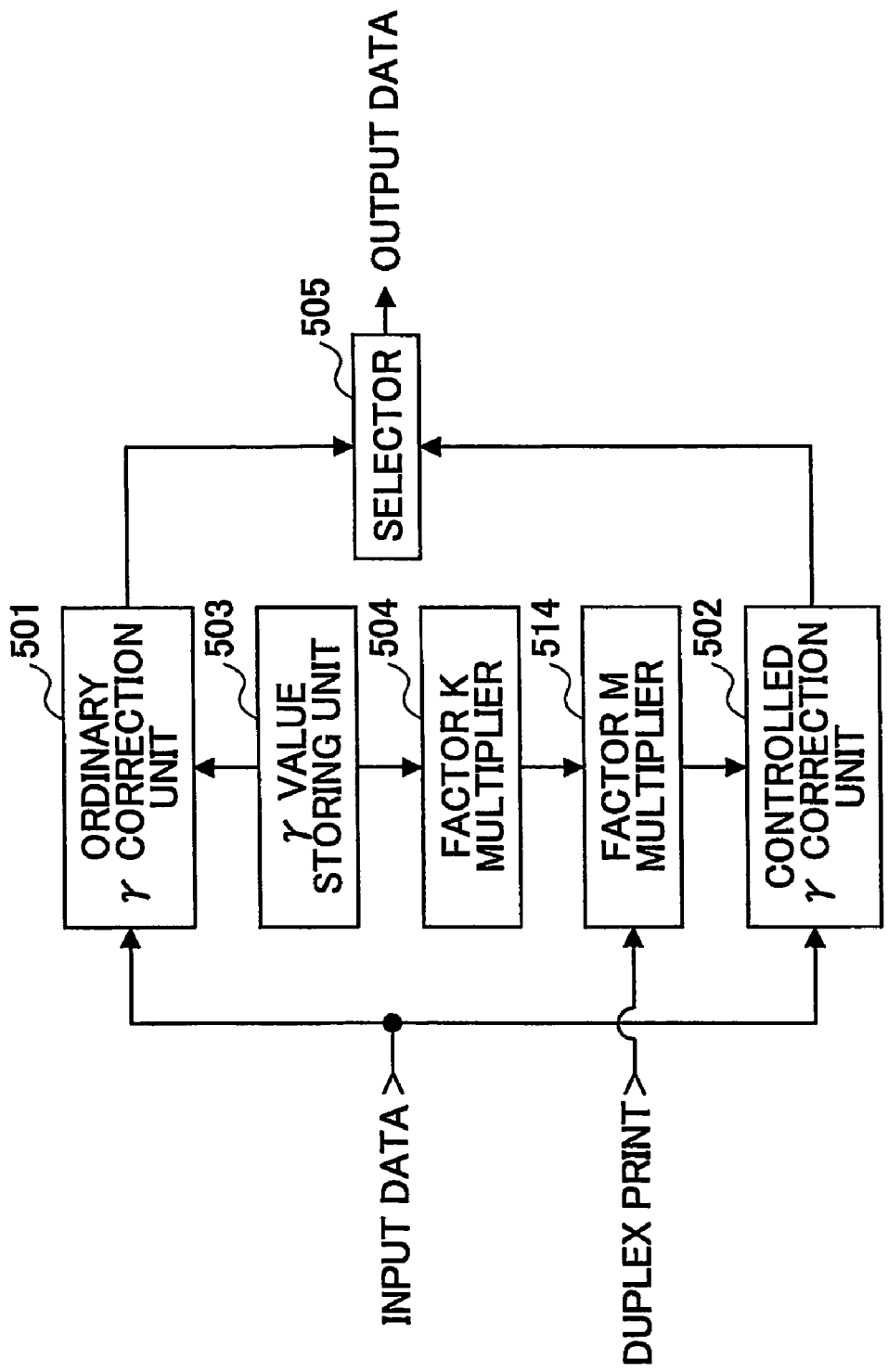
FIG. 29 is a diagram illustrating yet another example of gamma correction.

FIG. 29 illustrates a yet another example of the gamma correction processing unit according to the second embodiment of the invention. In this example, a factor M multiplier 514 is provided to the gamma correction processing unit 530 to produce a controlled gamma value. In this case, an ordinary gamma value multiplied by factor K is further multiplied by factor M (M<1.0) when conducting duplex printing. When a single-side print job is executed, the factor M multiplier 514 passes the controlled gamma value output from the factor K multiplier 504 as it is to the controlled gamma correction unit 502, without performing multiplication by factor M.

In duplex printing, the amount of ink adhesion becomes double, and multiplication by factor K is insufficient to prevent leakage of electric charge. Accordingly, the controlled gamma value is multiplied by another factor M (M<1.0) to further reduce the total amount of ink adhering to both sides of the paper. Leakage of electric charge is prevented on either side of the paper, and electrostatic attraction between the paper and the conveyor belt is maintained appropriately.

In this example, an ordinary gamma value is used in the ordinary gamma correction mode. A first controlled gamma value multiplied by factor K is used for single-side printing in the controlled gamma correction mode. A second controlled gamma value multiplied by factor K and factor M is used for duplex printing in the controlled gamma correction mode.

The gamma correction mode and the corresponding gamma value in the inkjet recording apparatus are set as follows in this example.

Ordinary Gamma Correction Mode: $\gamma$

Controlled gamma Correction (Single-Side Print): $\gamma \times K$

Controlled gamma Correction (Duplex Print): $\gamma \times K \times M$.

The preferred range of factor M is from 0.8 to 0.95 for avoiding duplexing problem. The product $K \times M$ is adjusted so as to achieve the optimum effect for preventing leakage of electric charge in duplexing print.

Although the first through fifth examples of the gamma correction have been explained using an application to an inkjet recording apparatus, the present invention is applicable to other image reproducing/forming apparatuses, such as printers, facsimile machines, copy machines, or multi-function image forming apparatuses (functioning as either a printer, a facsimile machine, or a photocopier), furnished with a paper transport mechanism using electrostatic attraction. In addition, the present invention is applicable to an image reproducing/forming apparatus that reproduce an image on a recording medium using a liquid material other than ink.

In the above-descried examples of the second embodiment, gamma correction for preventing leakage of electric charge is performed in the image reproducing/forming apparatus; however, gamma correction may be implemented by a printer driver 91 installed in an external host computer 90 (see FIG. 5).

Figure 30:
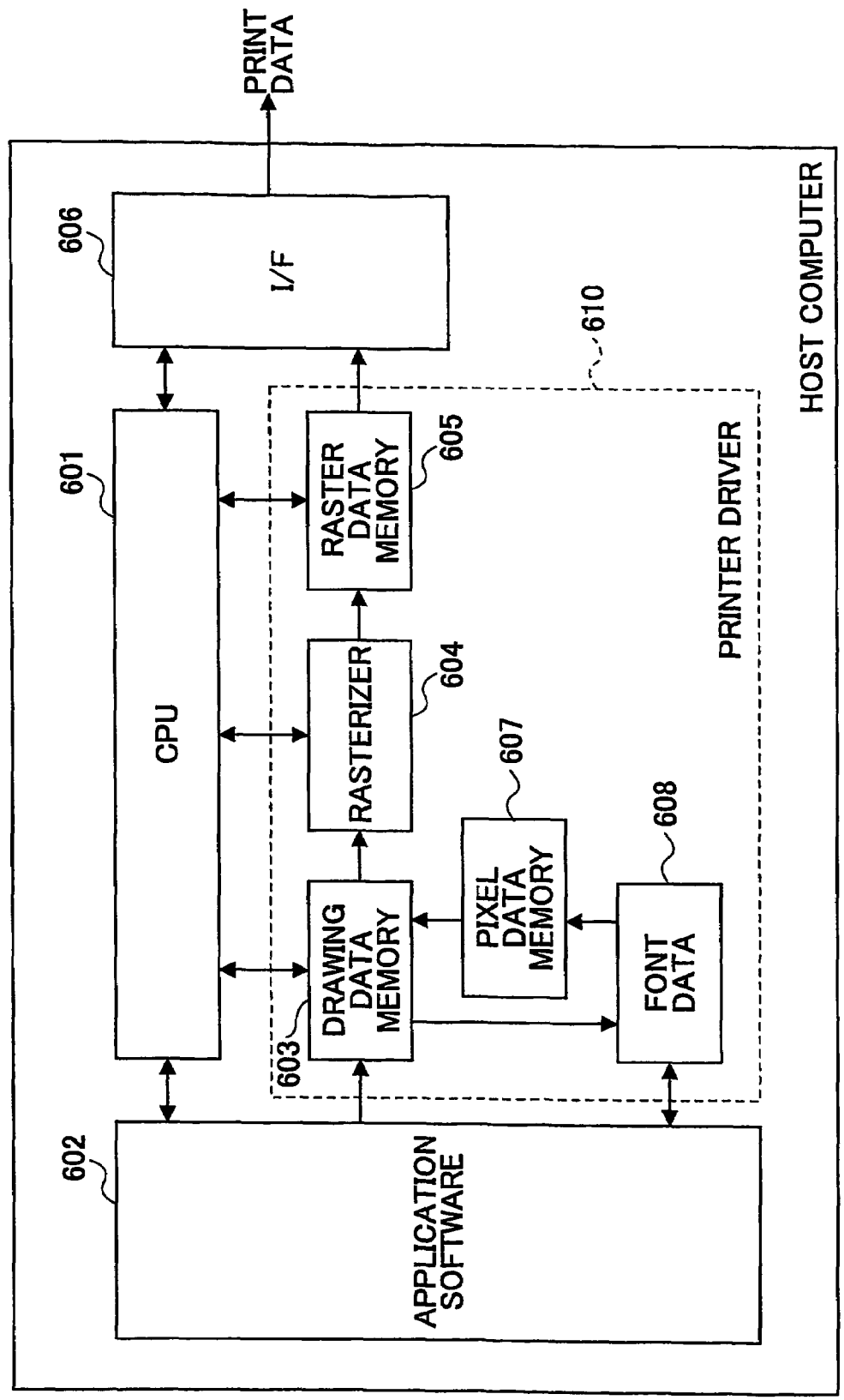
FIG. 30 is a block diagram of the host computer in which the printer driver is incorporated according to the second embodiment of the invention.

FIG. 30 is a block diagram of a host computer installed with a printer driver 610 according to the second embodiment of the invention. In this embodiment, an image reproducing/forming apparatus does not have to have a function of generating dot patterns to be actually recorded on paper based on a print command for printing pictures or texts. The printer driver 610 of the host computer generates dot pattern data and transfers the dot pattern data to an inkjet recording apparatus, for example.

In FIG. 30, application software 602 executed by the host computer supplies a print command (or a recording command) to the printer driver 610 installed in the host computer. The printer driver 610 processes the print command, and produces print data rasterized in dot pattern data designated by the print command. The dot pattern data are transferred to an image recording apparatus (or image reproducing/forming apparatus).

The print command for drawing picture or text is generated by the operating system or the application software 602 executed by the CPU 601 of the host computer. The print command is described by a specific print language, and it contains description about the location, the thickness and the length of a line to be recorded, or description about the position, the font, and the size of the text to be recorded. The print command is temporarily stored in the drawing data memory 603, and interpreted by the rasterizer 604. The rasterizer 604 converts the print command into dot pattern data to be actually recorded based on the interpretation. For example, the print command for recording a line is converted into dot pattern data according to the designated location, thickness, and length. The print command for recording text is converted into dot pattern data according to the designated position and size, using text outline information extracted from font outline data 608 stored in the host computer. These dot pattern data are stored in raster data memory 605.

When generating dot pattern data, the printer driver 310 performs gamma correction described in the first, second, fourth, or fifth example in gamma correction processing unit 607. Explanation for the gamma correction carried out by the gamma correction processing unit 607 is omitted here because it is already made in the above-described examples.

The dot pattern data stored in the raster data memory 605 are transferred as pixel data (or print data) to the inkjet recording apparatus or the image reproducing/forming apparatus via the interface 606.

By performing gamma correction in the printer driver of an external host computer, workload on the image reproducing/forming apparatus can be reduced.

Although the present invention has been described based on the preferred embodiments, the invention is not limited to these embodiments. For example, the factor M set for duplexing print may be combined with the factor K for preventing color different in bidirectional recording illustrated in the first embodiment. In this case, the preferred range of factor M is from 0.8 to 0.95. However, since the gamma value is already adjusted by factor K for reducing the amount of ink adhesion for the purpose of reducing color difference, the factor M used for duplexing print may be substituted by factor K when both the bidirectional printing mode and the duplexing print mode are set simultaneously. In this case, the factor K for reducing color difference is slightly adjusting so as to reflect the factor M.

There are many other substitutions and modifications apparent for those skilled in the art without departing the scope of the invention, which is defined in the appended claims.

The invention claimed is:

1. An image reproducing and forming apparatus comprising:
    a recording head configured to eject liquid droplets of at least one color and capable of bidirectional recording; and
    a controller configured to control an amount of liquid adhering to a recording paper so as to reduce color difference occurring in the bidirectional recording,
    wherein the controller controls the amount of liquid adhesion through controlled gamma correction using a controlled gamma value adjusted so as to reduce the color difference, and
    wherein the controller has a selector that selects either an ordinary gamma correction using an ordinary gamma value or the controlled gamma correction for reducing color difference using the controlled gamma value.

2. The image reproducing and forming apparatus of claim 1, wherein the controller has a determination unit that determines whether an object to be output is text, and wherein the controller does not perform a process of reducing the color difference when the object to be output is text.

3. The image reproducing and forming apparatus of claim 1, wherein the controller has a determination unit that determines an object to be output and the number of colors used in the bidirectional recording, and wherein the controller does not perform a process of reducing the color difference when the object to be output is not text and when the number of colors is one.

4. The image reproducing and forming apparatus of claim 1, wherein the controlled gamma value is a product of the ordinary gamma value and a factor K, wherein K is set in the range from 0.35 to 0.65.

5. An image reproducing and forming apparatus comprising:
    a recording head configured to eject liquid droplets of at least one color and capable of bidirectional recording; and
    a controller configured to control an amount of liquid adhering to a recording paper so as to reduce color difference occurring in the bidirectional recording,
    wherein the controller has a determination unit that at least one of (a) determines whether an object to be output is text, wherein the controller does not perform a process of reducing the color difference when the object to be output is text, and (b) determines an object to be output and the number of colors used in the bidirectional recording, wherein the controller does not perform a process of reducing the color difference when the object to be output is not text and when the number of colors is one,
    wherein the controller is configured to selectively perform either a controlled gamma correction for controlling the amount of liquid adhesion to reduce the color difference in bidirectional recording or an ordinary gamma correction nor addressed to reduction of the color difference, based on the determination result of the determination unit.

6. The image reproducing and forming apparatus of claim 5, wherein the controller uses a controlled gamma value to perform the controlled gamma correction, and uses an ordinary gamma value to perform the ordinary gamma correction.

7. The image reproducing and forming apparatus of claim 6, wherein the controlled gamma value is a product of the ordinary gamma value and a factor K, wherein K is set in the range from 0.35 to 0.65.

8. An image reproducing and forming apparatus comprising:
    a recording head configured to elect liquid droplets of at least one color and capable of bidirectional recording; and
    a controller configured to control an amount of liquid adhering to a recording paper so as to reduce color difference occurring in the bidirectional recording,
    wherein when duplexing is performed in the bidirectional recording, the controller further controls the amount of liquid adhering to the recording paper using a factor M, wherein M is less than 1.0.

9. A printer driver installed in a computer and configured to process image data to be supplied to an image reproducing and forming apparatus capable of bidirectional recording using a recording head for ejecting liquid droplets of at least one color onto a recording medium, the printer driver comprising:

a control unit configured to control an amount of liquid adhering to the recording medium so as to reduce color difference occurring in the bidirectional recording, wherein the control unit includes a gamma correction unit configured to selectively perform a controlled gamma correction using a controlled gamma value adjusted so as to reduce the color difference or an ordinary gamma correction using an ordinary gamma value, and wherein the controlled gamma value is a product of the ordinary gamma value and a factor K, wherein K is set in the range from 0.35 to 0.65.

10. The printer driver of claim 9, further comprising:
a determination unit configured to determine whether an object to be output is text, wherein the control unit does not perform a process of reducing the color difference when the object to be output is text.

11. The printer driver of claim 9, further comprising:
a determination unit configured to determine an object type and the number of colors used in image data, and wherein the control unit does not perform a process of reducing the color difference when the object type is not text and when the number of colors is one.

12. The printer driver of claim 9, wherein when the image data designates duplexing, the control unit uses a second controlled gamma value obtained by multiplying the product by a factor M, wherein M is less than 1.0.

13. A printer driver installed in a computer and configured to process image data to be supplied to an image reproducing and forming apparatus capable of bidirectional recording using a recording head for ejecting liquid droplets of at least one color onto a recording medium, the printer driver comprising:

a control unit configured to control an amount of liquid adhering to the recording medium so as to reduce color difference occurring in the bidirectional recording; and a determination unit configured to at least one of (a) determine whether an object to be output is text, wherein the control unit does not perform a process of reducing the color difference when the object to be output is text, and (b) determine an object type and the number of colors used in image data, wherein the control unit does not perform a process of reducing the color difference when the object type is not text and when the number of colors is one, wherein the control unit includes a gamma correction unit configured to selectively perform either a controlled gamma correction for controlling the amount of liquid adhesion or an ordinary gamma correction not for controlling the amount of liquid adhesion, based on either the determination result of the determination unit or an externally supplied instruction.

14. The printer driver of claim 13, wherein the control unit uses a controlled gamma value to perform the controlled gamma correction, and uses an ordinary gamma value to perform the ordinary gamma correction.

15. The printer driver of claim 14, wherein the controlled gamma value is a product of the ordinary gamma value and a factor K, wherein K is set in the range from 0.35 to 0.65.

16. The printer driver of claim 15, wherein when the image data designates duplexing. the control unit uses a second controlled gamma value obtained by multiplying the product by a factor M, wherein M is less than 1.0.

* * * * *